(12) United States Patent
Sone et al.

(10) Patent No.: US 10,800,209 B2
(45) Date of Patent: Oct. 13, 2020

(54) TIRE

(71) Applicant: BRIDGESTONE CORPORATION, Tokyo (JP)

(72) Inventors: Naoyuki Sone, Tokyo (JP); Takahiro Suzuki, Tokyo (JP); Atsushi Fukushima, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 331 days.

(21) Appl. No.: 15/756,363

(22) PCT Filed: Sep. 5, 2016

(86) PCT No.: PCT/JP2016/076019
§ 371 (c)(1),
(2) Date: Feb. 28, 2018

(87) PCT Pub. No.: WO2017/039014
PCT Pub. Date: Mar. 9, 2017

(65) Prior Publication Data
US 2018/0250983 A1    Sep. 6, 2018

(30) Foreign Application Priority Data

Sep. 4, 2015   (JP) .................. 2015-175171

(51) Int. Cl.
*B60C 1/00*      (2006.01)
*C08L 23/06*     (2006.01)
*C08L 23/26*     (2006.01)
*C08L 77/00*     (2006.01)
*B60C 5/01*      (2006.01)

(52) U.S. Cl.
CPC .............. *B60C 1/0008* (2013.01); *B60C 1/00* (2013.01); *B60C 5/01* (2013.01); *C08L 23/06* (2013.01); *C08L 23/26* (2013.01); *C08L 77/00* (2013.01); *C08L 2207/066* (2013.01)

(58) Field of Classification Search
CPC combination set(s) only.
See application file for complete search history.

(56) References Cited

U.S. PATENT DOCUMENTS

| 2010/0024941 A1 | 2/2010 | Hara et al. |
| 2012/0225990 A1 | 9/2012 | Jacob |
| 2013/0206301 A1* | 8/2013 | Fudemoto ................ B60C 9/22 |
| | | 152/450 |
| 2013/0206311 A1 | 8/2013 | Fudemoto et al. |

(Continued)

FOREIGN PATENT DOCUMENTS

| CN | 1114934 A | 1/1996 |
| CN | 101541530 A | 9/2009 |

(Continued)

OTHER PUBLICATIONS

Machine Translation of JP 2002-52904, 2020 (Year: 2020).*

(Continued)

*Primary Examiner* — Liam J Heincer
(74) *Attorney, Agent, or Firm* — Sughrue Mion, PPLC

(57) ABSTRACT

Provided is a tire which includes a circular tire frame formed from a resin material that contains a linear low-density polyethylene having a crystallization degree of from 110 J/g to 138 J.

5 Claims, 7 Drawing Sheets

(56) References Cited

U.S. PATENT DOCUMENTS

| | | | | |
|---|---|---|---|---|
| 2013/0319592 | A1* | 12/2013 | Harada | B60C 5/01 |
| | | | | 152/450 |
| 2015/0018495 | A1* | 1/2015 | Fukushima | B60C 1/00 |
| | | | | 525/420 |
| 2015/0020946 | A1 | 1/2015 | Fudemoto et al. | |
| 2015/0034227 | A1 | 2/2015 | Tsou et al. | |
| 2015/0053327 | A1 | 2/2015 | Harada et al. | |
| 2015/0114539 | A1* | 4/2015 | Fudemoto | B60C 1/00 |
| | | | | 152/537 |
| 2016/0001598 | A1* | 1/2016 | Ito | C08F 255/06 |
| | | | | 152/564 |
| 2017/0323589 | A1* | 11/2017 | Mitchell | B32B 27/32 |
| 2018/0016427 | A1* | 1/2018 | Fudemoto | B60C 1/0041 |
| 2018/0030253 | A1* | 2/2018 | Barion | B32B 7/10 |
| 2019/0078235 | A1* | 3/2019 | Lopez | E01C 13/08 |

FOREIGN PATENT DOCUMENTS

| | | |
|---|---|---|
| CN | 103189215 A | 7/2013 |
| CN | 103201121 A | 7/2013 |
| CN | 103403085 A | 11/2013 |
| CN | 104144797 A | 11/2014 |
| CN | 104159753 A | 11/2014 |
| CN | 104245356 A | 12/2014 |
| JP | 2002-012709 A | 1/2002 |
| JP | 2002-052904 A | 2/2002 |
| JP | 2006-076407 A | 3/2006 |
| JP | 2012-046031 A | 3/2012 |
| JP | 2015-231814 A | 12/2015 |
| WO | 2008060302 A1 | 5/2008 |

OTHER PUBLICATIONS

International Search Report of PCT/JP2016/076019 dated Sep. 27, 2016 [PCT/ISA/210].

Chinese Search Report of Office Action dated Nov. 15, 2019 in application No. 201680050427X.

Communication dated Jun. 25, 2018, from the European Patent Office in counterpart European Application No. 16842043.8.

\* cited by examiner

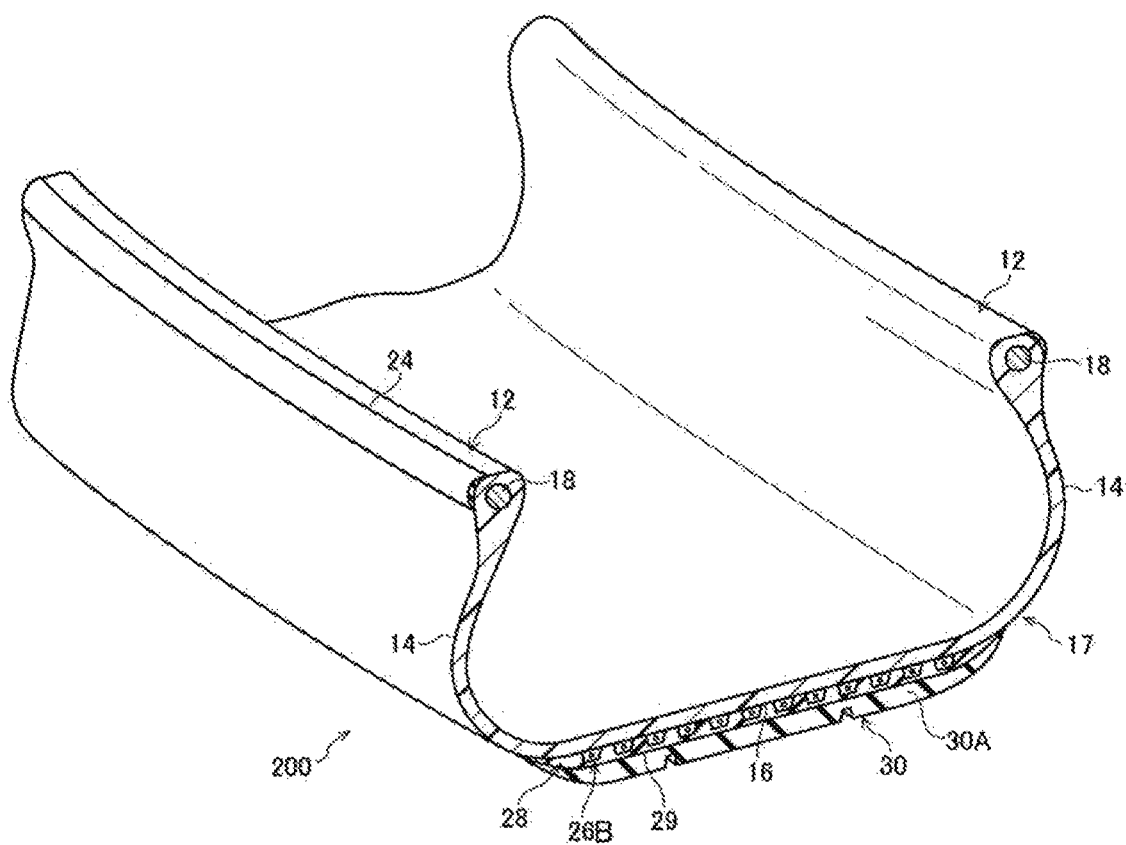

TIRE

CROSS REFERENCE TO RELATED APPLICATIONS

This application is a National Stage of International Application No. PCT/JP2016/076019, filed Sep. 5, 2016, claiming priority based on Japanese Patent Application No. 2015-175171, filed Sep. 4, 2015, the contents of all of which are incorporated herein by reference in their entirety.

TECHNICAL FIELD

The present invention relates to a tire to be mounted to a rim, particularly a tire which has a tire frame containing at least a resin material.

BACKGROUND ART

Conventionally, pneumatic tires composed of a rubber, an organic fiber material, a steel member and the like have been used in vehicles such as passenger cars. Rubber materials generally used in conventional pneumatic tires have no problem in terms of heat resistance and the like. However, the tire production process usually involves plural steps such as kneading, sheeting, molding, and vulcanization, and an improvement in productivity has been demanded.

In this regard, the use of resin materials, particularly thermoplastic resins and thermoplastic elastomers as tire materials, has been examined in recent years from the standpoints of, for example, weight reduction, ease of molding, and recyclability. These thermoplastic polymer materials (thermoplastic resin materials) have many advantages from the standpoint of improving productivity, such as being injection-moldable.

Further, tires in which a polyolefin-based thermoplastic elastomer is used as a thermoplastic resin material have been proposed (see, for example, Japanese Patent Application Laid-Open (JP-A) No. 2012-046031).

SUMMARY OF INVENTION

Technical Problem

Tires using a thermoplastic resin material can be produced more easily and at a lower cost than conventional rubber-made tires. However, in the production of a tire using a resin material, it is required to realize performance comparable to conventional rubber-made tires while achieving such a high production efficiency and a low cost. Specifically, even when the tire has a high temperature (e.g., 90° C.) during high-speed travel, the tire frame is required to have excellent properties of maintaining its shape, so-called creep characteristics. Further, the tire is also required to have appropriate elasticity and hardness as well as excellent durability.

Olefin resins have been examined as materials with which a high tire production efficiency and a low cost can be realized. However, in resin materials containing an olefin resin, it tends to be difficult to satisfy both creep characteristics and durability. Therefore, a tire in which an olefin resin, particularly a polyethylene-containing resin material, is used as a tire frame and which satisfies both creep characteristics and durability is desired.

In view of the above-described circumstances, an object of the present disclosure is to provide a tire which satisfies both creep characteristics and durability while using a polyethylene-containing resin material as a tire frame.

Solution to Problem

Concrete means for solving the above-described problems includes the following aspect.

[1] A tire including a circular tire frame formed from a resin material that contains a linear low-density polyethylene having a crystallization degree of from 110 J/g to 138 J/g.

Effects of Invention

According to the disclosure, a tire which satisfies both creep characteristics and durability while using a polyethylene-containing resin material as a tire frame is provided.

BRIEF DESCRIPTION OF DRAWINGS

FIG. 4A is a cross-sectional view of a tire according to a second embodiment taken along the tire width direction;

DESCRIPTION OF EMBODIMENTS

Mode for Carrying Out the Invention

Figure 1A:
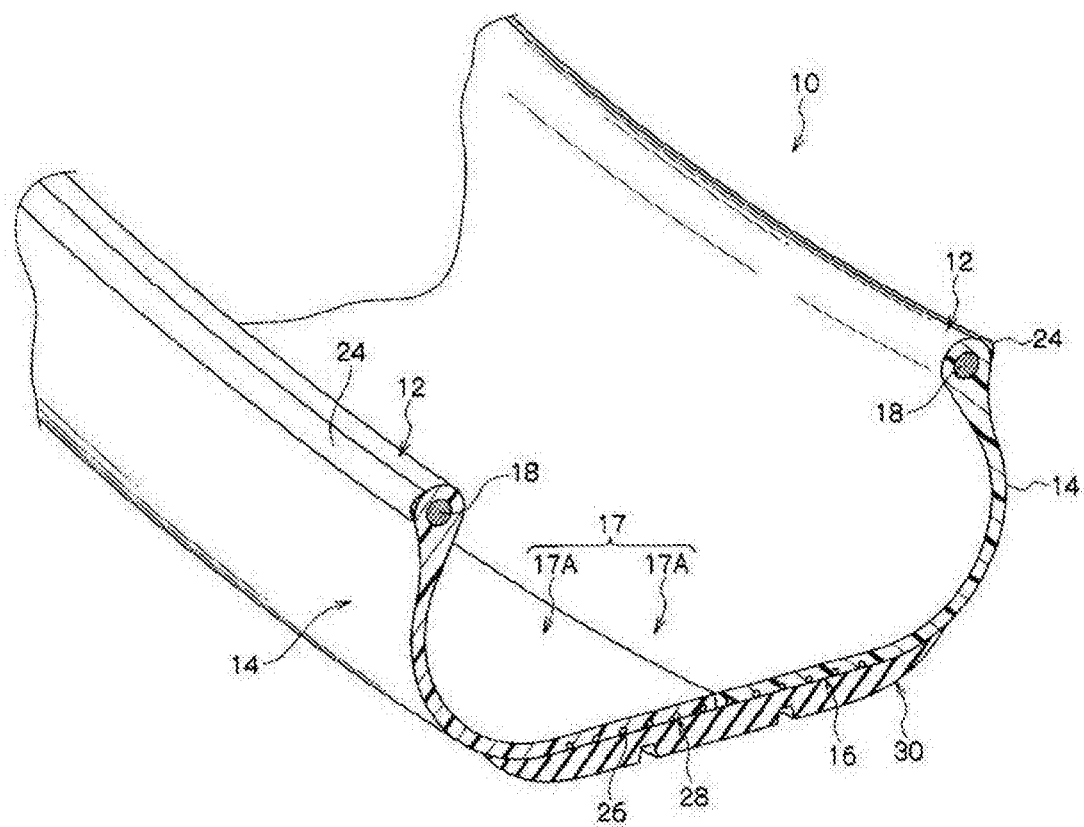
FIG. 1A is a perspective view illustrating a cross-section of a part of a tire according to a first embodiment.

Specific embodiments of the invention are described below in detail. The invention is, however, not restricted to the following disclosure and embodiments by any means, and the invention can be carried out with modifications as appropriate within the intended scope of the invention.

The "resin" used herein is a concept that encompasses thermoplastic resins (including thermoplastic elastomers) and thermosetting resins but does not include vulcanized rubbers.

In the present specification, those numerical ranges that are stated with "to" each denote a range that includes the numerical values stated before and after "to" as the lower and upper limit values, respectively.

Further, the term "step" encompasses not only discrete steps but also steps which cannot be clearly distinguished from other steps, as long as the intended purpose of the step is achieved.

The term "crystallization degree" used herein means a value calculated from the endothermic peak area in a curve (DSC curve) obtained by differential scanning calorimetry (DSC).

The crystallization degree is measured in accordance with ASTM D3418-8 using a differential scanning calorimeter (DSC). Specifically, a measurement subject is placed on an aluminum pan and an empty pan is set as a control, after which the measurement is performed at a heating rate of 10° C./min. The melting point of indium and that of zinc are used for temperature correction of the detection unit of the measuring device, and the fusion heat of indium is used for colorimetric correction.

The tire of the disclosure includes a circular tire frame formed from a resin material that contains a linear low-density polyethylene having a crystallization degree of from 110 J/g to 138 J/g.

It is noted here that, in the present specification, the phrase "linear low-density polyethylene having a crystallization degree of from 110 J/g to 138 J/g" may be referred to as "specific LLDPE".

Further, the term "linear low-density polyethylene" may be referred to as "LLDPE". In the present specification, a simple description of "LLDPE" encompasses the above-described specific LLDPE and other LLDPEs.

The tire of the disclosure is believed to exhibit excellent creep characteristics even when the tire has a high temperature (e.g., 90° C.) during high-speed travel since the resin material constituting the tire frame contains the specific LLDPE.

Further, by incorporating the specific LLDPE into the resin material constituting the tire frame, the elasticity of the tire is controlled in an appropriate range, so that excellent durability as a tire can be attained.

[Circular Tire Frame Formed from Resin Material]

The tire of the disclosure includes a circular tire frame formed from a resin material that contains a linear low-density polyethylene having a crystallization degree of from 110 J/g to 138 J/g (specific LLDPE).

The resin material may also contain a resin other than the specific LLDPE.

It is preferred that the resin other than the specific LLDPE contains a polyamide from the standpoint of improving the heat resistance, and at least one selected from polyamide-modified polyethylenes from the standpoint of improving the heat resistance and the dispersibility of the resin.

In cases where a combination of the specific LLDPE and other resin is used in the resin material, the resin material preferably contains an acid-modified polyethylene from the standpoint of the dispersibility of the resins.

(Specific LLDPE)

The resin material contains at least one linear low-density polyethylene having a crystallization degree of from 110 J/g to 138 J/g (specific LLDPE).

As described above, a value measured by DSC is used as the value of the crystallization degree.

The crystallization degree can be adjusted based on, for example, the molecular weight of the whole LLDPE, the length of a side chain, and/or the number of side chains per 1,000 carbon atoms of the main chain.

When the crystallization degree is 110 J/g or higher, since the molecular chain movement is restricted, the specific LLDPE is imparted with an appropriate hardness and thus exhibits excellent creep characteristics.

Meanwhile, when the crystallization degree is 138 J/g or lower, since the specific LLDPE is not excessively hard, the elastic modulus of the resin material can be easily adjusted in an appropriate range.

The crystallization degree of the specific LLDPE is, from the above-described standpoints, preferably from 110 J/g to 132 J/g, more preferably from 110 J/g to 125 J/g.

The term "linear low-density polyethylene (LLDPE)" used herein refers to a copolymer of ethylene and an α-olefin having from 3 to 20 carbon atoms, which copolymer has a density of from 0.910 g/m³ to less than 0.930 g/m³. It is noted here that LLDPEs are distinguished from low-density polyethylenes (LDPEs) in that LLDPEs do not have a long-chain branch of more than 20 carbon atoms.

From the standpoint of easily adjusting the crystallization degree in the prescribed range, the α-olefin is preferably an α-olefin having from 4 to 12 carbon atoms. Specific examples of the α-olefin include propylene, 1-butene, 1-pentene, 4-methyl-1-pentene, 1-hexene, 1-octene, 1-nonene, 1-decene, and 1-dodecene.

As the LLDPE, one which is produced by a conventionally known general production method using a conventionally known general catalyst can be used.

Examples of the conventionally known catalyst include Ziegler catalysts, metallocene catalysts, and vanadium catalysts. Thereamong, from the standpoint of easily adjusting the crystallization degree of the LLDPE in the prescribed range, metallocene catalysts and Ziegler catalysts are preferred, and metallocene catalysts are more preferred.

Examples of the conventionally known production method include vapor-phase polymerization, solution polymerization, slurry polymerization, and high-pressure ionic polymerization. Thereamong, from the standpoint of easily adjusting the crystallization degree of the LLDPE in the prescribed range, vapor-phase polymerization and solution polymerization are preferred, and vapor-phase polymerization is more preferred.

The weight-average molecular weight of the specific LLDPE is not particularly restricted; however, it is preferably from 140,000 to 190,000, more preferably 150,000 to 190,000, still more preferably 150,000 to 170,000.

The weight-average molecular weight can be measured by gel permeation chromatography (GPC) using, for example, a GPC (gel permeation chromatography) apparatus such as "HLC-8321GPC/HT" manufactured by Tosoh Corporation.

The melting point (Tm) of the specific LLDPE is not particularly restricted; however, it is preferably 100° C. or higher. With the melting point (Tm) of the specific LLDPE being 100° C. or higher, when the specific LLDPE is made into a tire, a tire frame capable of withstanding the heat generated during running is easily obtained. From this standpoint, the melting point of the specific LLDPE is preferably 105° C. or higher, more preferably 110° C. or higher. From the standpoint of molecular structure, the melting point of the specific LLDPE is preferably not higher than 130° C.

It is noted here that the term "melting point (Tm)" means a melting peak temperature that is measured using a differential scanning calorimeter (DSC) in accordance with the method prescribed in JIS K7121:2012 at a heating rate of 10° C./min.

The melt flow rate (MFR) of the specific LLDPE is not particularly restricted; however, it is preferably from 0.5 g/10 min to 10.0 g/10 min, more preferably from 1.0 g/10 min to 9.0 g/10 min, still more preferably from 1.5 g/10 min to 8.0 g/10 min. When the MFR is 1.5 g/10 min or higher, superior injection properties are attained at the time of injection molding the tire frame. Meanwhile, when the MFR is 8.0 g/10 min or less, superior heat resistance is attained.

The MFR is a value measured in accordance with the method prescribed in JIS K7210:2014 under the conditions of a temperature of 190° C. and a load of 2.16 kg.

In the disclosure, the tensile elastic modulus of the specific LLDPE is preferably from 100 MPa to 700 MPa, more preferably from 140 MPa to 470 MPa, still more preferably from 230 MPa to 350 MPa. When the tensile elastic modulus of the specific LLDPE is from 100 to 700 MPa, the tire can be efficiently mounted on a rim while maintaining the shape of the tire frame.

The term "tensile elastic modulus" refers to a value measured in accordance with JIS K7113:1995.

Examples of the specific LLDPE include commercially available products, such as UMERIT 1540F, 2525F, and 2540F, which are manufactured by Ube-Maruzen Polyethylene Co., Ltd.; NOVATEC-LL UF230 manufactured by Japan Polyethylene Corporation; and ULTZEX 2022L, NEOZEX 2511F, and EVOLUE SP1540, which are manufactured by Prime Polymer Co., Ltd.

(Polyamide)

It is preferred that the resin material further contains at least one polyamide.

By further incorporating a polyamide into the resin material, the heat resistance of the tire frame is improved.

Examples of the polyamide include polyamides that are synthesized using a monomer represented by the following Formula (1) or (2).

Formula (1)

$H_2N-R^1-COOH$

In Formula (1), $R^1$ represents an aliphatic hydrocarbon molecular chain having from 2 to 20 carbon atoms. Examples of the aliphatic hydrocarbon molecular chain having from 2 to 20 carbon atoms include alkylene groups having from 2 to 20 carbon atoms.

Formula (2)

In Formula (2), $R^2$ represents an aliphatic hydrocarbon molecular chain having from 3 to 20 carbon atoms. Examples of the aliphatic hydrocarbon molecular chain having from 3 to 20 carbon atoms include alkylene groups having from 3 to 20 carbon atoms.

In Formula (1), $R^1$ is preferably an aliphatic hydrocarbon molecular chain having from 3 to 18 carbon atoms (e.g., an alkylene group having from 3 to 18 carbon atoms), more preferably an aliphatic hydrocarbon molecular chain having from 4 to 15 carbon atoms (e.g., an alkylene group having from 4 to 15 carbon atoms), particularly preferably an aliphatic hydrocarbon molecular chain having from 10 to 15 carbon atom (e.g., an alkylene group having from 10 to 15 carbon atoms). In Formula (2), $R^2$ is preferably an aliphatic hydrocarbon molecular chain having from 3 to 18 carbon atoms (e.g., an alkylene group having from 3 to 18 carbon atoms), more preferably an aliphatic hydrocarbon molecular chain having from 4 to 15 carbon atom (e.g., an alkylene group having from 4 to 15 carbon atoms), particularly preferably an aliphatic hydrocarbon molecular chain having from 10 to 15 carbon atoms (e.g., an alkylene group having from 10 to 15 carbon atoms).

Examples of the monomer represented by Formula (1) or (2) include ω-aminocarboxylic acids and lactams. Examples of the polyamide include polycondensates of an ω-aminocarboxylic acid, a lactam, and the like; and copolycondensates of a diamine and a dicarboxylic acid.

Examples of the ω-aminocarboxylic acid include aliphatic w-aminocarboxylic acids having from 5 to 20 carbon atoms, such as 6-aminocaproic acid, 7-aminoheptanoic acid, 8-aminooctanoic acid, 10-aminocapric acid, 11-aminoundecanoic acid, and 12-aminododecanoic acid. Examples of the lactam include aliphatic lactams having from 5 to 20 carbon atoms, such as lauryl lactam, ε-caprolactam, undecanelactam, ω-enantholactam, and 2-pyrrolidone.

Examples of the diamine include diamine compounds such as aliphatic diamines having from 2 to 20 carbon atoms (e.g., ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexamethylenediamine, 2,4,4-trimethylhexamethylenediamine, and 3-methylpentamethylenediamine). The dicarboxylic acid can be represented by $HOOC-(R^3)_m-COOH$ ($R^3$: a hydrocarbon molecular chain having from 2 to 20 carbon atoms, m: 0 or 1), and examples thereof include aliphatic dicarboxylic acids having from 2 to 22 carbon atoms, such as oxalic acid, succinic acid, glutaric acid, adipic acid, pimelic acid, suberic acid, azelaic acid, sebacic acid, and dodecanedioic acid.

Examples of the polyamide include a polyamide (Polyamide 6) obtained by ring-opening polycondensation of ε-caprolactam, a polyamide (Polyamide 11) obtained by ring-opening polycondensation of undecanelactam, a polyamide (Polyamide 12) obtained by ring-opening polycondensation of lauryl lactam, a polyamide (Polyamide 12) obtained by polycondensation of 12-aminododecanoic acid, and a polyamide (Polyamide 66) obtained by polycondensation of a diamine and a dibasic acid.

Polyamide 6 can be represented by, for example, $\{CO-(CH_2)_5-NH\}_n$ (wherein, n represents an arbitrary number of repeating units), and n is, for example, preferably from 2 to 100, more preferably from 3 to 50.

Polyamide 11 can be represented by, for example, $\{CO-(CH_2)_{10}-NH\}_n$ (wherein, n represents an arbitrary number of repeating units), and n is, for example, preferably from 2 to 100, more preferably from 3 to 50.

Polyamide 12 can be represented by, for example, $\{CO-(CH_2)_{11}-NH\}_n$ (wherein, n represents an arbitrary number of repeating units), and n is, for example, preferably from 2 to 100, more preferably from 3 to 50.

Polyamide 66 can be represented by, for example, $\{CO(CH_2)_4CONH(CH_2)_6NH\}_n$ (wherein, n represents an arbitrary number of repeating units), and n is, for example, preferably from 2 to 100, more preferably from 3 to 50.

As a commercially available product of Polyamide 6, for example, "UBE NYLON" Series (e.g., 1022B and 1011FB) manufactured by Ube Industries, Ltd. can be used.

As a commercially available product of Polyamide 11, for example, "RILSAN B" Series manufactured by Arkema K.K. can be used.

As a commercially available product of Polyamide 12, for example, "UBE NYLON" Series (e.g., 3024U, 3020U, and 3014U) manufactured by Ube Industries, Ltd. can be used.

As a commercially available product of Polyamide 66, for example, "UBE NYLON" Series (e.g., 2020B and 2015B) manufactured by Ube Industries, Ltd. can be used. As a commercially available product of Polyamide MX, for example, "MX NYLON" Series (e.g., S6001, S6021, and S6011) manufactured by Mitsubishi Gas Chemical Co., Inc. can be used.

(Polyamide-Modified Polyethylene)

The resin material may also contain at least one polyamide-modified polyethylene.

By incorporating a polyamide-modified polyethylene into the resin material, the heat resistance of the tire frame is improved. In addition, since a polyamide-modified polyethylene is easily miscible with the specific LLDPE, an interface of the two kinds of resins is unlikely to form in the form of a mixture. Therefore, for example, stress concentration at such an interface is unlikely to occur during bending, and the resistance of the tire frame against bending fatigue is improved.

The term "polyamide-modified polyethylene" used herein refers to a polyethylene in which a polyamide is bound to a part of the molecular chain. Examples of the polyamide to be bound to a polyethylene include the above-described polyamides. Examples of the polyethylene include low-density polyethylenes (LDPEs), linear low-density polyethylenes (LLDPEs), and high-density polyethylenes (HDPEs). From the standpoint of the compatibility with the specific LLDPE, the polyethylene used in the polyamide-modified polyethylene is preferably an LLDPE, more preferably the specific LLDPE.

Examples of the polyamide-modified polyethylene include LP91 manufactured by Arkema K.K.

(Acid-Modified Polyethylene)

The resin material may also contain at least one acid-modified polyethylene.

In cases where the resin material contains the specific LLDPE and two or more kinds of other resins, at least one of the other resins is preferably an acid-modified polyethylene, and the dispersibility of the resins is improved by incorporating an acid-modified polyethylene. Accordingly, the resin material has excellent bending fatigue resistance.

From the standpoint of inhibiting deterioration of the resin material, examples of an acidic group contained in the acid-modified polyethylene include weak acid groups such as a carboxylic acid group, a sulfuric acid group, and a phosphoric acid group, among which a carboxylic acid group is particularly preferred.

The term "acid-modified" used herein means that an unsaturated compound having an acidic group (e.g., a carboxylic acid group, a sulfuric acid group, or a phosphoric acid group) is bound to a polyethylene. For example, when an unsaturated carboxylic acid (generally, maleic anhydride) is used as the unsaturated compound having an acidic group, an unsaturated binding site of the unsaturated carboxylic acid is bound (e.g., graft-polymerized) to a polyethylene.

Usually, acid modification of a polyethylene can be performed by kneading the polyethylene, an unsaturated compound having an acidic group (e.g., unsaturated carboxylic acid) and an organic peroxide using a biaxial extruder or the like, and graft-copolymerizing the polyethylene with the unsaturated compound having an acidic group. The unsaturated compound having an acidic group is added in an amount of preferably from 0.01 parts by mass to 20 parts by mass, more preferably from 0.01 parts by mass to 10 parts by mass, with respect to 100 parts by mass of the polyethylene.

When the unsaturated compound having an acidic group is added in an excessively small amount, the amount thereof grafted to the polyethylene is reduced. Meanwhile, when the added amount is excessively large, since the amount of unreacted unsaturated carboxylic acid in the resulting resin is increased, a sufficient adhesive strength cannot be obtained, and the processability is thus deteriorated.

The amount of the organic peroxide to be added may be any amount as long as it is sufficient for performing a graft reaction, and it is, for example, preferably from 0.01 parts by mass to 5 parts by mass, more preferably from 0.03 parts by mass to 1 part by mass.

Examples of the organic peroxide include 1,1-bis(t-butylperoxy)cyclohexane, 2,2-bis(4,4-di-t-butylperoxycyclohexyl)propane, 1,1-bis(t-butylperoxy)cyclododecane, t-hexylperoxyisopropyl monocarbonate, t-butylperoxy-3,5,5-trimethyl hexanoate, t-butylperoxylaurate, 2,5-dimethyl-2,5-di(benzoylperoxy)hexane, t-butylperoxyacetate, 2,2-bis(t-butylperoxy)butene, t-butylperoxybenzoate, n-butyl-4,4-bis(t-peroxy)valerate, di-t-butylperoxy isophthalate, dicumyl peroxide, α-α'-bis(t-butylperoxy-m-isopropyl)benzene, 2,5-dimethyl-2,5-di(t-butylperoxy)hexane, 1,3-bis(t-butylperoxydiisopropyl)benzene, t-butylcumyl peroxide, di-t-butyl peroxide, p-menthane hydroperoxide, 2,5-dimethyl-2,5-di(t-butylperoxy)hexine-3, di-3-methoxybutylperoxy dicarbonate, di-2-ethylhexylperoxy dicarbonate, bis(4-t-butylcyclohexyl)peroxy dicarbonate, diisopropylperoxy dicarbonate, t-butylperoxyisopropyl carbonate, dimyristyl peroxycarbonate, 1,1,3,3-tetramethylbutyl neodecanoate, α-cumyl peroxyneodecanoate, and t-butyl peroxyneodecanoate. These organic peroxides may be used singly, or in combination of two or more thereof.

Examples of the acid-modified polyethylene include polyethylenes that are graft-polymerized with acrylic acid, methacrylic acid, itaconic acid, crotonic acid, isocrotonic acid, maleic acid, or the like.

The acid-modified polyethylene is preferably a maleic acid-modified polyethylene obtained by graft-modification of a polyethylene with maleic anhydride. Examples of a base polymer include linear low-density polyethylenes (LLDPEs) and high-density polyethylenes (HDPEs). Specific examples thereof include ADMER NF539, NE827, NE065, and XE070, which are manufactured by Mitsui Chemicals, Inc.

(Other Components)

In the resin material, as desired, a variety of additives, examples of which include rubbers, thermoplastic elastomers, thermoplastic resins, various fillers (e.g., silica, calcium carbonate, clay), age resistors, oils, plasticizers, colorants, weather resistant agents and reinforcing agents, may also be incorporated.

—Preferred Formulation of Resin Material—

In the disclosure, the resin material may contain, as a resin component(s), the specific LLDPE alone, or the specific LLDPE and at least one other resin.

In cases where the resin material contains the specific LLDPE alone as a resin component, the content of the specific LLDPE in the resin material is not particularly restricted; however, it is preferably not less than 50% by mass, more preferably from 50% by mass to 100% by mass, still more preferably from 70% by mass to 100% by mass, with respect to the total mass of the resin material. When the content of the specific LLDPE is not less than 50% by mass with respect to the total mass of the resin material, the specific LLDPE can sufficiently exhibit its properties, so that the durability and creep characteristics of the resulting tire can be improved.

In cases where the resin material contains the specific LLDPE and other resin, the other resin is preferably at least one selected from polyamides and polyamide-modified polyethylenes.

In cases where the resin material contains the specific LLDPE and other resin, the content of the specific LLDPE in the resin material is not particularly restricted; however, it is preferably not less than 50% by mass, more preferably from 50% by mass to 90% by mass, still more preferably from 65% by mass to 80% by mass, with respect to the total mass of the resin material. When the content of the specific LLDPE is not less than 50% by mass with respect to the total mass of the resin material, the specific LLDPE can sufficiently exhibit its properties, so that the durability and creep characteristics of the resulting tire can be improved. Meanwhile, when the content of the specific LLDPE is 90% by mass or less with respect to the total mass of the resin material, the properties of the other resin can be exerted more prominently.

In cases where the resin material contains a polyamide, the content of the polyamide in the resin material is not particularly restricted; however, it is preferably 20% by mass or less, more preferably from 5% by mass to 20% by mass, still more preferably from 9% by mass to 19% by mass, with respect to the total mass of the resin material.

When the content of the polyamide is 20% by mass or less with respect to the total mass of the resin material, the heat resistance can be improved while maintaining the elastic modulus of the resin material at an appropriate level.

In cases where the resin material contains a polyamide-modified polyethylene, the content of the polyamide-modified polyethylene in the resin material is not particularly restricted; however, it is preferably 20% by mass or less, more preferably from 5% by mass to 20% by mass, still more preferably from 9% by mass to 19% by mass, with respect to the total mass of the resin material.

In cases where the resin material contains the specific LLDPE and at least one selected from polyamides and polyamide-modified polyethylenes, it is preferred that the resin material further contains an acid-modified polyethylene.

In cases where the resin material contains an acid-modified polyethylene, the content of the acid-modified polyethylene in the resin material is not particularly restricted; however, it is preferably 20% by mass or less, more preferably 10% by mass or less, still more preferably from 2% by mass to 7% by mass, with respect to the total mass of the resin material. By controlling the content of the acid-modified polyethylene in this range, the bending fatigue resistance of the resin material can be improved while maintaining other physical properties.

It is preferred that the resin material of the disclosure contains the specific LLDPE and a polyamide.

In cases where the resin material contains the specific LLDPE and a polyamide, the content ratio of the polyamide with respect to the specific LLDPE in the resin material (the content ratio of the polyamide, taking the content of the specific LLDPE in the resin material as "1") is preferably from 0.10 to 0.30, more preferably from 0.12 to 0.29, still more preferably from 0.14 to 0.29.

When the above-described content ratio is 0.10 or higher, the heat resistance of the resin material is improved. Meanwhile, when the content ratio is 0.30 or lower, since the resin material is not excessively hard, an appropriate elastic modulus can be easily maintained as a tire frame. Thus, a tire having such a tire frame is advantageous in that it is capable of maintaining a sufficient level of bending fatigue resistance required for a tire.

—Physical Properties of Resin Material—

The melting point of a specific LLDPE-containing resin material is usually from 100° C. to 200° C. and, from the standpoint of the tire productivity, it is preferably from 110° C. to 200° C. or so. By using such a resin material that contains the specific LLDPE and has a melting point of from 100° C. to 200° C., for example, when a tire frame is formed by fusing its segments (frame pieces), the heating temperature of the parts to be joined can be set to be not lower than the melting point of the resin material constituting the tire frame.

Since the tire of the disclosure uses a specific LLDPE-containing resin material, a sufficient adhesive strength is attained between the tire frame pieces even in a frame obtained by fusion thereof performed in a temperature range of from 100° C. to 200° C. Therefore, the tire of the disclosure exhibits excellent durability during running in terms of puncture resistance, wear resistance and the like. The heating temperature is preferably higher than the melting point of the specific LLDPE-containing resin material constituting the tire frame pieces by 10° C. to 150° C., more preferably by 10° C. to 100° C.

The tensile elastic modulus (hereinafter, unless otherwise specified, the term "elastic modulus" used herein means tensile elastic modulus), which is defined in JIS K7113:1995, of the specific LLDPE-containing resin material itself is preferably from 100 MPa to 700 MPa, more preferably from 140 MPa to 470 MPa, particularly preferably from 230 MPa to 350 MPa. When the tensile elastic modulus of the resin material is from 100 MPa to 700 MPa, the tire can be efficiently mounted on a rim while maintaining the shape of the tire frame.

The tensile strength at yield, which is defined in JIS K7113:1995, of the specific LLDPE-containing resin material itself is preferably not less than 5 MPa, more preferably from 5 MPa to 20 MPa, still more preferably from 5 MPa to 17 MPa. When the tensile strength at yield of the resin material is 5 MPa or greater, the tire is capable of enduring deformation caused by a load applied to the tire during running or the like.

The tensile elongation at yield, which is defined in JIS K7113:1995, of the specific LLDPE-containing resin material itself is preferably not less than 10%, more preferably from 10% to 70%, still more preferably from 15% to 60%. When the tensile elongation at yield of the resin material is 10% or greater, a large elastic region is provided, so that the rim fittability can be improved.

The tensile elongation at break, which is defined in JIS K7113:1995, of the specific LLDPE-containing resin material itself is preferably not less than 50%, more preferably not less than 100%, still more preferably not less than 150%, particularly preferably not less than 200%. When the tensile elongation at break of the resin material is 50% or greater, favorable rim fittability can be attained, and the tire can be made unlikely to rupture at collision.

The deflection temperature under load, which is defined in ISO75-2 or ASTM D648, of the specific LLDPE-containing resin material itself (under a load of 0.45 MPa) is preferably 50° C. or higher, more preferably from 50° C. to 150° C., still more preferably from 50° C. to 130° C. With the deflection temperature under load of the resin material being 50° C. or higher, deformation of the tire frame can be inhibited even when vulcanization is performed in the production of the tire.

[Reinforcing Cord Layer]

The tire of the disclosure may have a reinforcing cord layer which is wound on the outer circumferential portion of the tire frame in the circumferential direction to form a reinforcing cord.

The reinforcing cord layer can be configured to contain a resin material. By incorporating a resin material into the reinforcing cord layer in this manner, since the difference in hardness between the tire and the reinforcing cord layer can be reduced as compared to a case where the reinforcing cord is fixed with a cushion rubber, a reinforcing cord member can be more tightly adhered to and more firmly fixed with the tire frame. When a simple expression of "resin" is used as in the above, the "resin" is a concept that encompasses thermoplastic resins (including thermoplastic elastomers) and thermosetting resins but does not include vulcanized rubbers.

Further, when the reinforcing cord member is a steel cord and an attempt is made to separate the reinforcing cord member from the cushion rubber at the time of tire disposal, it is difficult to separate a vulcanized rubber from the reinforcing cord member only by heating; however, a resin material can be separated from the reinforcing cord material only by heating, which is advantageous in terms of recyclability of the tire. In addition, a resin material usually has a lower loss coefficient (tan δ) than vulcanized rubbers. Therefore, the rolling performance of the tire can be improved by incorporating a large amount of the resin material into the reinforcing cord layer. Moreover, a resin material having a relatively high elastic modulus as compared to vulcanized rubbers is also advantageous in that such a resin material has higher in-plane shear rigidity and provides superior steering stability and wear resistance during tire running.

Examples of a thermosetting resin that can be used in the reinforcing cord layer include phenol resins, urea resins, melamine resins, epoxy resins, polyamide resins, and polyester resins.

Examples of a thermoplastic resin include urethane resins, olefin resins, vinyl chloride resins, polyamide resins, and polyester resins.

Examples of a thermoplastic elastomer include amide-based thermoplastic elastomers (TPA), polyester-based thermoplastic elastomers (TPC), polyolefin-based thermoplastic elastomers (TPO), polystyrene-based thermoplastic elastomers (TPS), polyurethane-based thermoplastic elastomers (TPU), cross-linked thermoplastic rubbers (TPV), and other thermoplastic elastomers (TPZ), all of which are defined in JIS K6418:2007. Taking into consideration the elasticity required during running as well as the moldability in the production and the like, it is preferred to use a thermoplastic elastomer.

In cases where the reinforcing cord layer is configured in such a manner that at least a part of the reinforcing cord member is embedded, it is preferred that the resin material contained in the reinforcing cord layer is mainly the specific LLDPE-containing resin material in the vicinity of the cord-embedded portion of the tire frame; however, the resin material may take a mode of further coating other resin as well. In this case, the specific LLDPE-containing resin material constituting the tire frame preferably contains an acid-modified polyethylene from the standpoint of adhesion with the other resin.

Moreover, in cases where the reinforcing cord layer is constituted by a reinforcing cord coated with a resin material, it is preferred to select a resin material highly fusible with the specific LLDPE by heating or the like. As such a resin material highly (thermally) fusible with the specific LLDPE, for example, a polyolefin-based thermoplastic elastomer (e.g., an ethylene-propylene copolymer) or a thermoplastic polyolefin resin (e.g., an LLDPE) can be used. Particularly, the resin material contained in the reinforcing cord layer preferably contains a thermoplastic polyolefin resin and, from the standpoint of the drawing properties of the reinforcing cord, the resin material more preferably contains a polyethylene.

Examples of the polyethylene contained in the resin material constituting the reinforcing cord layer include linear low-density polyethylenes (LLDPEs), low-density polyethylenes (LDPEs), high-density polyethylenes (HDPE), and acid-modified polyethylenes.

The elastic modulus (tensile elastic modulus defined in JIS K7113:1995) of the resin material used in the reinforcing cord layer is preferably set in a range of from 0.1 times to 10 times of the elastic modulus of the resin material constituting the tire frame. When the elastic modulus of the resin material is 10 times or less of that of the resin material constituting the tire frame, the crown portion is not excessively hard, so that the tire can be easily fitted to a rim. Meanwhile, when the elastic modulus of the resin material is 0.1 times or greater of that of the resin material constituting the tire frame, the resin constituting the reinforcing cord layer is not excessively soft, so that excellent belt in-plane shear rigidity is attained and the cornering ability is improved.

In cases where a resin material is incorporated into the reinforcing cord layer, from the standpoint of improving the pull-out property (difficulty to be pulled out) of the reinforcing cord, preferably not less than 20%, more preferably not less than 50% of the surface of the reinforcing cord member is covered with the resin material. The content of the resin material in the reinforcing cord layer is, from the standpoint of improving the pull-out property of the reinforcing cord, preferably not less than 20% by mass, more preferably not less than 50% by mass, with respect to the total mass of the materials constituting the reinforcing cord layer excluding the reinforcing cord.

First Embodiment

A tire according to a first embodiment of the tire of the disclosure is described below referring to the drawings.

Figure 1B:
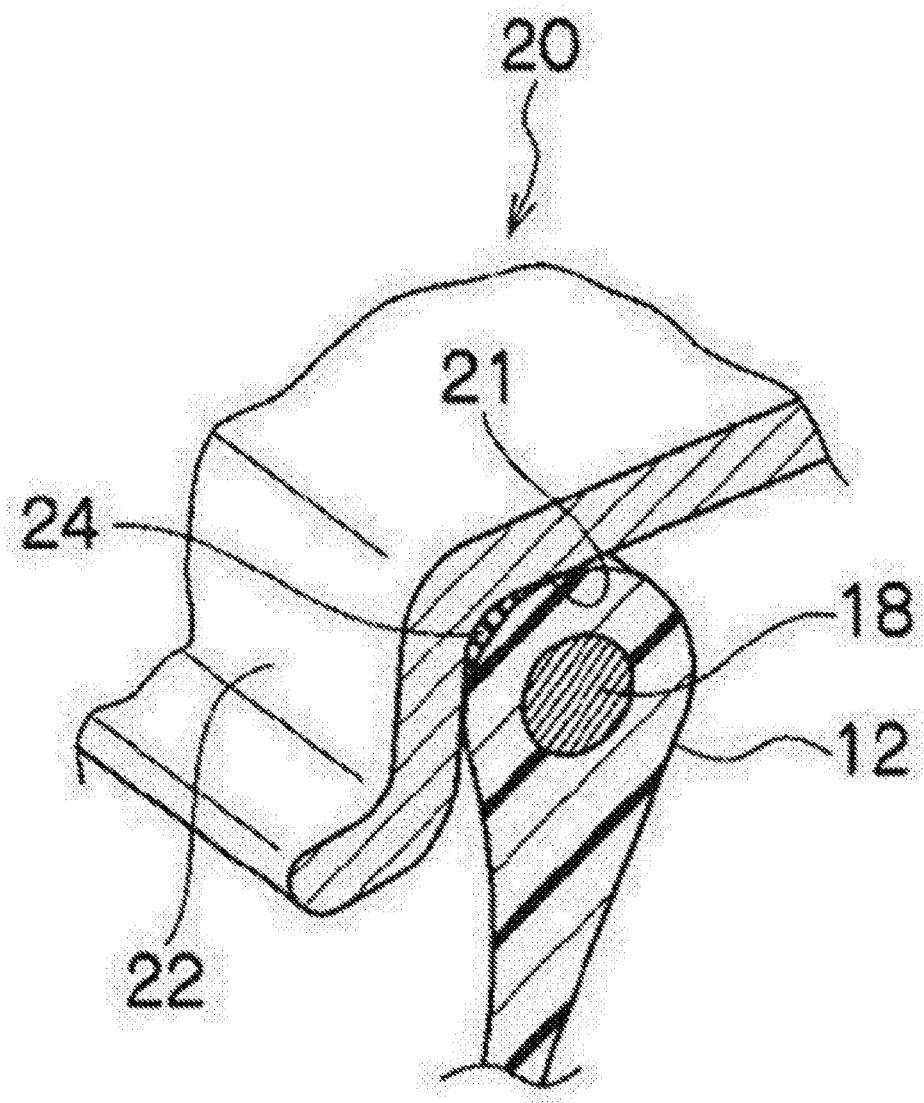
FIG. 1B is a cross-sectional view of a bead portion according to the first embodiment, which the bead portion has been fitted to a rim.

A tire 10 of this embodiment is described below. FIG. 1A is a perspective view illustrating a cross-section of a part of the tire according to the first embodiment. FIG. 1B is a cross-sectional view of a bead portion according to the first embodiment, which bead portion has been fitted to a rim. As illustrated in FIG. 1A, the tire 10 of this embodiment has a cross-sectional shape that is substantially the same as those of conventional ordinary rubber-made pneumatic tires.

As illustrated in FIG. 1A, the tire 10 includes a tire case (tire frame) 17, which includes: a pair of bead portions 12, which are each in contact with a bead sheet 21 and a rim flange 22 of a rim 20 illustrated in FIG. 1B; side portions 14, which extend on the tire radial-direction outer side from the respective bead portions 12; and a crown portion 16 (outer circumferential portion), which connects the tire radial-direction outer end of one side portion 14 with the tire radial-direction outer end of the other side portion 14.

The tire case 17 of this embodiment is formed from a specific LLDPE-containing resin material.

In this embodiment, the tire case 17 is formed from the specific LLDPE-containing resin material; however, the invention is not restricted to this configuration, and resin materials having different characteristics may be used for the respective parts of the tire case 17 (e.g., the side portions 14, the crown portion 16, and the bead portions 12) as in the case of a conventional ordinary rubber-made pneumatic tire. Further, a reinforcing material (e.g., polymer or metal fibers, cords, a non-woven fabric, or a woven fabric) may be embedded in the tire case 17 (e.g., the bead portions 12, the side portions 14, and the crown portion 16) so as to reinforce the tire case 17 with the reinforcing material.

The tire case 17 of this embodiment is obtained by joining together a pair of tire case half sections (tire frame pieces) 17A formed from the specific LLDPE-containing resin material. The tire case half sections 17A are each formed by integrally molding (e.g., injection molding) one bead portion 12, one side portion 14 and a half-width crown portion 16, and the resulting tire case half sections 17A having the same annular shape are aligned to face each other and joined at the tire equatorial plane to form the tire case 17. The tire case 17 is not restricted to be formed by joining two members and may be formed by joining three or more members.

The tire case half sections 17A formed from the specific LLDPE-containing resin material can be molded by, for example, vacuum molding, pressure molding, injection molding, or melt casting. Therefore, as compared to a conventional case of molding a tire case from a rubber, since vulcanization is not required, the production process can be greatly simplified and the molding time can be shortened.

In addition, in this embodiment, since the tire case half sections 17A have a bilaterally symmetrical shape, that is, one of the tire case half sections 17A has the same shape as the other tire case half section 17A, there is also an advantage that only one type of mold is required for molding the tire case half sections 17A.

In this embodiment, as illustrated in FIG. 1B, an annular bead core 18 composed of a steel cord, which is similar to those used in conventional ordinary pneumatic tires, is embedded in each bead portion 12. However, the invention is not restricted to this configuration, and the bead core 18 may be omitted as long as the rigidity of the bead portions 12 is ensured and there is no problem in fitting the bead portions 12 with the rim 20. The bead core 18 may also be formed using, for example, an organic fiber cord, a resin-coated organic fiber cord or a hard resin, in addition to the steel cord.

In this embodiment, an annular sealing layer 24 (sealing portion) composed of a material (e.g., a rubber) having superior sealing performance than the specific LLDPE-containing resin material constituting the tire case 17 is formed on a part of each bead portion 12 that comes into contact with the rim 20, or at least on a part of each bead portion 12 that comes into contact with the rim flange 22 of the rim 20. This sealing layer 24 may also be formed on the parts where the tire case 17 (bead portions 12) comes into contact with the bead sheet 21. As the material having superior sealing performance than the specific LLDPE-containing resin material constituting the tire case 17, a material softer than the specific LLDPE-containing resin material constituting the tire case 17 can be used. As a rubber that can be used for the sealing layer 24, it is preferred to use a rubber of the same kind as the rubbers used on the outer surfaces of the bead portions of conventional ordinary rubber-made pneumatic tires. The sealing layer 24 composed of a rubber may be omitted as long as the specific LLDPE-containing resin material alone can ensure sealing performance with the rim 20, and other kind of resin that has superior sealing performance than the specific LLDPE-containing resin material may be used as well. Examples of such other kind of resin include resins, such as polyamide-based resins, polyolefin-based resins, polystyrene-based resins and polyester resins; and blends of these resins with a rubber or an elastomer. It is also possible to use a thermoplastic elastomer, and examples thereof include polyester-based thermoplastic elastomers, polyamide-based thermoplastic elastomers, polystyrene-based thermoplastic elastomers, polyurethane-based thermoplastic elastomers, polyolefin-based thermoplastic elastomers, combinations of these elastomers, and blends of these elastomers with a rubber.

As illustrated in FIG. 1A, in the crown portion 16, a reinforcing cord 26 (reinforcing cord member) having higher rigidity than the specific LLDPE-containing resin material constituting the tire case 17 is wound in the circumferential direction of the tire case 17. In a cross-sectional view taken along the axial direction of the tire case 17, the reinforcing cord 26 is spirally wound with at least a part thereof being embedded in the crown portion 16, and forms a reinforcing cord layer 28. On the tire radial-direction outer circumferential side of the reinforcing cord layer 28, a tread 30 composed of a material (e.g., a rubber) having superior wear resistance than the specific LLDPE-containing resin material constituting the tire case 17 is arranged.

Figure 2:
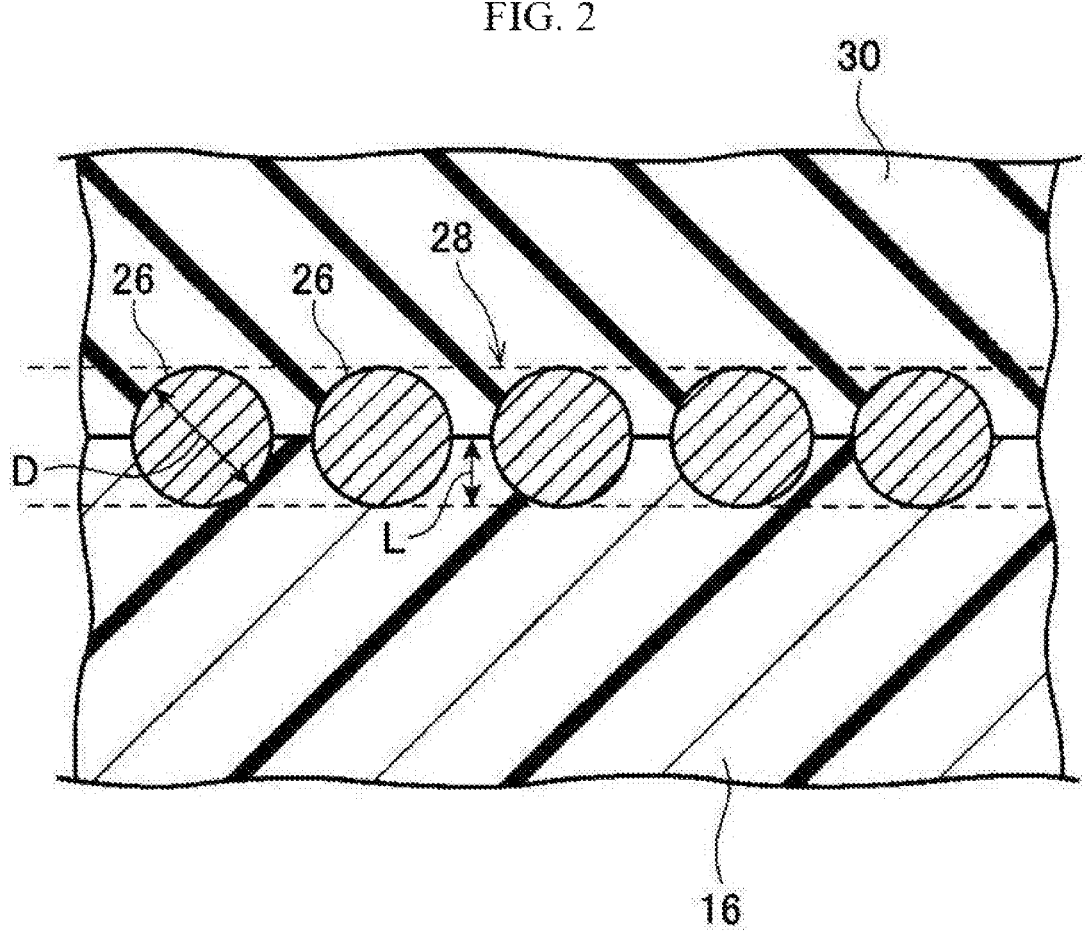
FIG. 2 is a cross-sectional view taken along the tire rotation axis, which illustrates a state where a reinforcing cord is embedded in a crown portion of a tire case of the tire according to the first embodiment.

The reinforcing cord layer 28 formed by the reinforcing cord 26 is described below referring to FIG. 2. FIG. 2 is a cross-sectional view taken along the tire rotation axis, which illustrates a state where the reinforcing cord is embedded in the crown portion of the tire case of the tire according to the first embodiment. As illustrated in FIG. 2, in a cross-sectional view taken along the axial direction of the tire case 17, the reinforcing cord 26 is spirally wound with at least a part thereof being embedded in the crown portion 16, and forms the reinforcing cord layer 28, which is indicated by the part between the dashed lines in FIG. 2, together with a part of the outer circumferential portion of the tire case 17. The part of the reinforcing cord 26 that is embedded in the crown portion 16 is in close contact with the specific LLDPE-containing resin material constituting the crown portion 16 (tire case 17). As the reinforcing cord 26, for example, a monofilament (single strand) of metal fibers, organic fibers or the like, or a multifilament (twisted strand) in which such fibers are twisted together (e.g., a steel cord composed of twisted steel fibers), can be used. In this embodiment, a steel cord is used as the reinforcing cord 26.

In FIG. 2, the embedding depth L indicates the amount of the reinforcing cord 26 embedded in the tire case 17 (crown portion 16) along the tire rotation axis direction. The embedding depth L of the reinforcing cord 26 in the crown portion 16 is preferably not less than $1/5$, more preferably greater than $1/2$, of the diameter D of the reinforcing cord 26 (the diameter of the reinforcing cord member). It is most preferred that the entirety of the reinforcing cord 26 is embedded in the crown portion 16. When the embedding depth L of the reinforcing cord 26 (the embedding depth of the reinforcing cord member) is greater than $1/2$ of the diameter D of the reinforcing cord 26, the reinforcing cord 26 is unlikely to come out of the embedded portion because of the dimensions of the reinforcing cord 26. Further, when the entirety of the reinforcing cord 26 is embedded into the crown portion 16, since the surface (outer circumferential surface) is made flat, entry of air to the periphery of the reinforcing cord 26 can be inhibited even if a member is placed on the crown portion 16 where the reinforcing cord 26 is embedded. The reinforcing cord layer 28 corresponds to a belt arranged on the outer circumferential surface of a carcass of a conventional rubber-made pneumatic tire.

As described above, the tread 30 is arranged on the tire radial-direction outer circumferential side of the reinforcing cord layer 28. As the rubber used for this tread 30, it is preferred to use a rubber of the same kind as the rubbers used in conventional rubber-made pneumatic tires. In place of the tread 30, a tread formed from other kind of resin that has superior wear resistance than the specific LLDPE-containing resin material constituting the tire case 17 may be used as well. On the surface of the tread 30 that comes into contact with the road surface, a tread pattern constituted by plural grooves is formed in the same manner as in conventional rubber-made pneumatic tires.

A method of producing the tire of this embodiment is described below.

(Tire Frame Molding Step)

First, tire case half sections each supported on a thin metal support ring are aligned to face each other. Subsequently, a joining mold (not illustrated) is placed in such a manner that it comes into contact with the outer circumferential surfaces of the abutting parts of the tire case half sections. It is noted here that the joining mold is configured in such a manner to press the peripheries of the joining parts (abutting parts) of the tire case half sections A with a prescribed pressure. Then, the peripheries of the joining parts of the tire case half sections are pressed at a temperature of not lower than the melting point of the resin material constituting the resulting tire case. When the joining parts of the tire case half sections are heated and pressurized by the joining mold, the joining parts are melted and the tire case half sections are fused together, as a result of which these members are integrated to form the tire case 17. In this embodiment, the joining parts of the tire case half sections are heated using the joining mold; however, the invention is not restricted to this mode, and the tire case half sections may also be joined together by, for example, heating the joining parts using a separately arranged high-frequency heater or the like, or softening or melting the joining parts in advance by irradiation with hot air, infrared radiation or the like and subsequently applying a pressure to the joining parts using a joining mold.

(Reinforcing Cord Member Winding Step)

Figure 3:
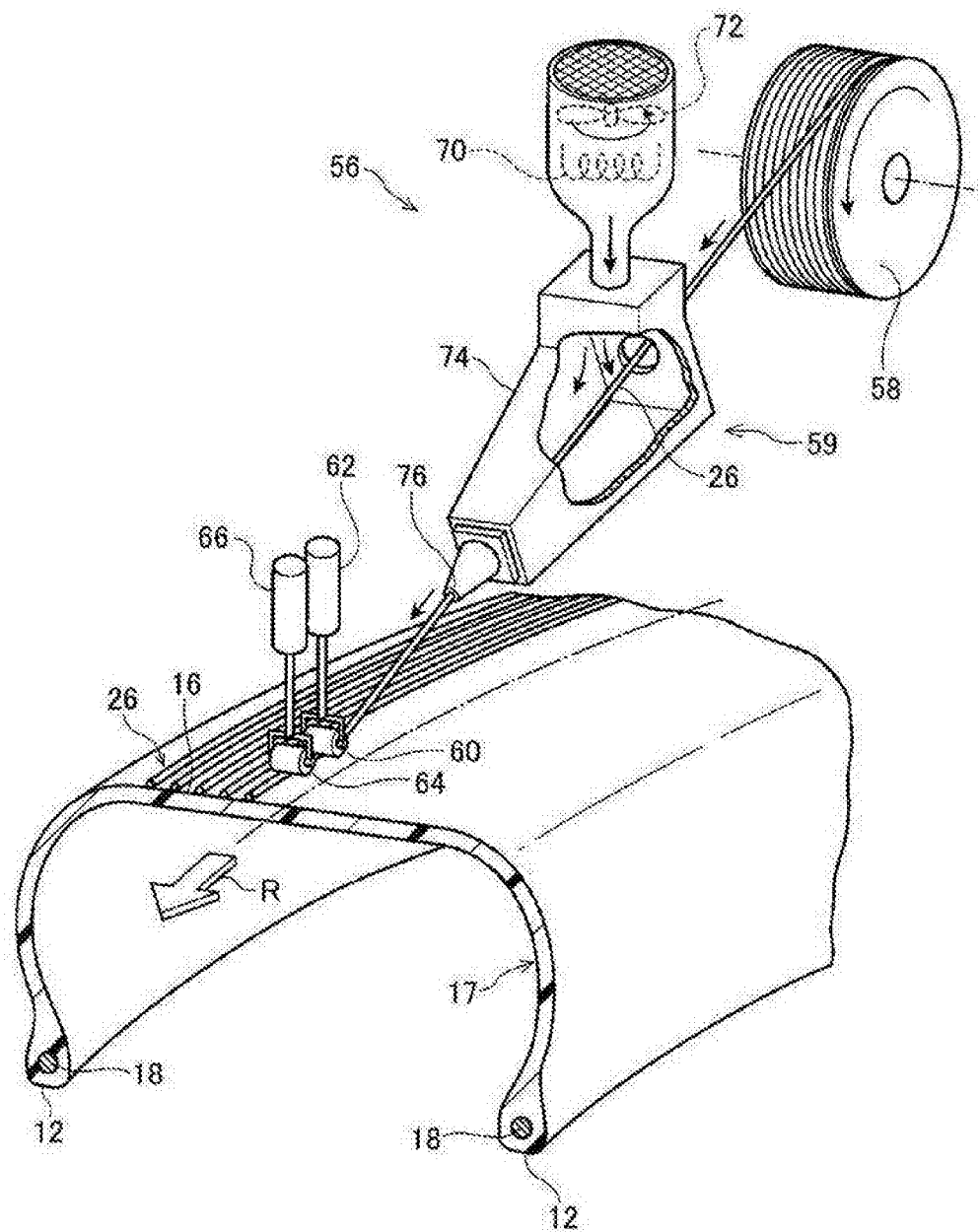
FIG. 3 is a drawing for explaining operations of embedding the reinforcing cord in the crown portion of the tire case using a cord heating device and rollers.

The reinforcing cord member winding step is described below referring to FIG. 3. FIG. 3 is a drawing for explaining operations of embedding a reinforcing cord in the crown portion of the tire case using a cord heating device and rollers. In FIG. 3, a cord feeding apparatus 56 includes: a reel 58, on which the reinforcing cord 26 is wound; a cord heating device 59, which is arranged on the cord transfer direction downstream side of the reel 58; a first roller 60, which is arranged on the reinforcing cord 26 transfer direction downstream side; a first cylinder device 62, which moves the first roller 60 in a direction towards or away from the tire outer circumferential surface; a second roller 64, which is arranged on the reinforcing cord 26 transfer direction downstream side of the first roller 60; and a second cylinder device 66, which moves the second roller 64 in a direction towards or away from the tire outer circumferential surface. The second roller 64 can be utilized as a cooling roller made of a metal. Further, in this embodiment, the surface of the first roller 60 and that of the second roller 64 are coated with a fluororesin (in this embodiment, TEFLON (registered trademark)) so as to inhibit adhesion of the melted or softened specific LLDPE-containing resin material. In this embodiment, the cord feeding apparatus 56 is configured to have two rollers, which are the first roller 60 and the second roller 64; however, the invention is not restricted to this configuration, and the cord feeding apparatus 56 may be configured to have only one of these rollers (i.e., a single roller).

The cord heating device 59 includes a heater 70 and a fan 72, which generate hot air. In addition, the cord heating device 59 further includes: a heating box 74, to which hot air is supplied and in which the reinforcing cord 26 passes through the inner space; and a discharge outlet 76, through which the thus heated reinforcing cord 26 is discharged.

In this step, first, the temperature of the heater 70 of the cord heating device 59 is increased, and the ambient air heated by the heater 70 is sent to the heating box 74 by an air flow generated by rotation of the fan 72. Then, the reinforcing cord 26 drawn from the reel 58 is transferred into the heating box 74 whose inner space has been heated with hot air, whereby the reinforcing cord 26 is heated (for example, the temperature of the reinforcing cord 26 is increased to 100° C. to 200° C. or so). The thus heated reinforcing cord 26 passes through the discharge outlet 76 and is then spirally wound with a constant tension on the outer circumferential surface of the crown portion 16 of the tire case 17 rotating in the direction of an arrow R as illustrated in FIG. 3. Here, once the heated reinforcing cord 26 comes into contact with the outer circumferential surface of the crown portion 16, the specific LLDPE-containing resin material of the part in contact is melted or softened, and at least a part of the heated reinforcing cord 26 is embedded in the outer circumferential surface of the crown portion 16. In this process, since the heated reinforcing cord 26 is embedded into the melted or softened specific LLDPE-containing resin material, a state where there is no gap between the specific LLDPE-containing resin material and the reinforcing cord 26, namely a close contact state, is created. Consequently, entry of air into the parts where the reinforcing cord 26 is embedded is inhibited. By heating the reinforcing cord 26 to a temperature higher than the melting point of the specific LLDPE-containing resin material of the tire case 17, the melting or softening of the specific LLDPE-containing resin material in those parts in contact with the reinforcing cord 26 is facilitated. In the above-described manner, not only the reinforcing cord 26 can be easily embedded on the outer circumferential surface of the crown portion 16, but also entry of air can be effectively inhibited.

The embedding depth L of the reinforcing cord 26 can be adjusted by changing, for example, the heating temperature of the reinforcing cord 26, the tension acting on the reinforcing cord 26, and/or the pressure applied by the first roller 60. In this embodiment, the embedding depth L of the reinforcing cord 26 is set to be not less than ⅕ of the diameter D of the reinforcing cord 26. The embedding depth L of the reinforcing cord 26 is more preferably greater than ½ of the diameter D, and it is most preferred that the entirety of the reinforcing cord 26 is embedded.

In the above-described manner, by winding the heated reinforcing cord 26 on the outer circumferential surface of the crown portion 16 while embedding the reinforcing cord 26, the reinforcing cord layer 28 is formed on the outer circumferential side of the crown portion 16 of the tire case 17.

Next, a belt-form vulcanized tread 30 is wound for one lap on the outer circumferential surface of the tire case 17, and the tread 30 is bonded on the outer circumferential surface of the tire case 17 using an adhesive or the like. As the tread 30, for example, a precured tread used in conventionally known retreaded tires can be used. This step is equivalent to the step of bonding a precured tread on the outer circumferential surface of a base tire of a retreaded tire.

Thereafter, the sealing layer 24 composed of a vulcanized rubber is bonded to each bead portion 12 of the tire case 17 using an adhesive or the like, whereby the tire 10 is completed.

(Effects)

In the tire 10 of this embodiment, since the tire case 17 is formed from the specific LLDPE-containing resin material, excellent durability and creep characteristics are attained. In addition, since the specific LLDPE-containing resin material itself is lightweight and the tire 10 has a simpler structure than conventional rubber-made tires, the tire 10 is light in weight. Therefore, the tire 10 of this embodiment has high durability.

When the specific LLDPE-containing resin material further contains an acid-modified polyethylene, this resin material not only is much more adhesive to the reinforcing cord 26 but also has superior fixation performance (e.g., welding strength) as compared to other resins. Therefore, for example, a phenomenon that air remains around the reinforcing cord 26 (entry of air) in the reinforcing cord winding step can be effectively inhibited. With the resin material being highly adhesive and weldable to the reinforcing cord 26 and the entry of air to the periphery of the reinforcing cord member being thereby further inhibited, the movement of the reinforcing cord 26 caused by an input or the like during running can be effectively suppressed. As a result, for example, even when a tire-constituting member is arranged on the outer circumferential portion of the tire frame in such a manner to cover the entirety of the reinforcing cord member, since the movement of the reinforcing cord member is suppressed, delamination and the like of these members (including the tire frame) are inhibited, so that the durability of the tire 10 is improved.

In the tire 10 of this embodiment, since the reinforcing cord 26 having higher rigidity than the specific LLDPE-containing resin material is spirally wound in the circumferential direction on the outer circumferential surface of the crown portion 16 of the tire case 17 formed from the specific LLDPE-containing resin material, the puncture resistance, the cut resistance and the circumferential rigidity of the tire 10 are improved. By the improvement in the circumferential rigidity of the tire 10, creeping of the tire case 17 formed from the specific LLDPE-containing resin material is inhibited.

In a cross-sectional view taken along the axial direction of the tire case 17 (the cross-sectional view illustrated in FIG. 1A), the reinforcing cord 26 is at least partially embedded and in close contact with the specific LLDPE-containing resin material on the outer circumferential surface of the crown portion 16 of the tire case 17 formed from the specific LLDPE-containing resin material; therefore, entry of air during the production is inhibited, and the movement of the reinforcing cord 26 caused by an input or the like during running is suppressed. As a result, delamination and the like of the reinforcing cord 26, the tire case 17 and the tread 30 are inhibited, so that the durability of the tire 10 is improved.

Moreover, as illustrated in FIG. 2, since the embedding depth L of the reinforcing cord 26 is not less than ⅕ of the diameter D, entry of air during the production is effectively inhibited, so that the movement of the reinforcing cord 26 caused by an input or the like during running is further suppressed.

By constituting the reinforcing cord layer 28 with the specific LLDPE-containing resin material in this manner, the difference in hardness between the tire case 17 and the reinforcing cord layer 28 can be reduced as compared to a case where the reinforcing cord 26 is fixed with a cushion rubber; therefore, the reinforcing cord 26 can be tightly adhered to and fixed with the tire case 17. Consequently, the above-described entry of air can be effectively inhibited, and the movement of the reinforcing cord member during running can be effectively suppressed.

When the reinforcing cord 26 is a steel cord, the tire 10 is advantageous in terms of recycling property since, at the time of tire disposal, the reinforcing cord 26 can be easily separated and recovered from the specific LLDPE-containing resin material by heating. In addition, since the specific LLDPE-containing resin material has a lower loss coefficient (tan δ) than vulcanized rubbers, the rolling performance of the tire can be improved by incorporating a large amount of the specific LLDPE-containing resin material into the reinforcing cord layer 28. The specific LLDPE-containing resin material is also more advantageous than vulcanized rubbers in that the resin material has higher in-plane shear rigidity and provides superior steering stability and wear resistance during tire running.

Further, since the tread 30, which comes into contact with the road surface, is constituted by a rubber material having superior wear resistance than the specific LLDPE-containing resin material, the tire 10 has an improved wear resistance.

Moreover, the annular bead core 18 composed of a metal material is embedded in each of the bead portions 12; therefore, the tire case 17, namely the tire 10, is firmly retained on the rim 20 in the same manner as in conventional rubber-made pneumatic tires.

Furthermore, since the sealing layer 24, which is composed of a rubber material having superior sealing performance than the specific LLDPE-containing resin material, is arranged on the parts of the bead portions 12 that come into contact with the rim 20, the sealing performance between the tire 10 and the rim 20 is improved. Accordingly, as compared to a case where sealing is performed with the rim 20 and the specific LLDPE-containing resin material, leakage of air from the tire is further inhibited. In addition, the rim fittability is also improved by arranging the sealing layer 24.

The above-described embodiment adopts a configuration in which the reinforcing cord 26 is heated and the thus heated reinforcing cord 26 melts or softens the specific LLDPE-containing resin material of the parts in contact therewith; however, the invention is not restricted to this configuration, and a configuration in which, without heating the reinforcing cord 26, the outer circumferential surface of the crown portion 16 where the reinforcing cord 26 is to be embedded is heated using a hot air-generating apparatus and the reinforcing cord 26 is subsequently embedded in the crown portion 16, may be adopted as well.

In the first embodiment, the heat source of the cord heating device 59 is constituted by the heater and the fan; however, the invention is not restricted to this configuration, and a configuration in which the reinforcing cord 26 is directly heated by radiant heat (e.g., infrared radiation) may be adopted as well.

Further, a configuration in which those parts where the reinforcing cord 26 is embedded and the resin material is thereby melted or softened are forcibly cooled by the second roller 64 made of a metal is adopted in the first embodiment; however, the invention is not restricted to this configuration, and a configuration in which cold air is directly blown to the parts where the resin material has been melted or softened so as to forcibly cool and solidify the melted and softened parts of the resin material may be adopted as well.

Moreover, a configuration in which the reinforcing cord 26 is heated is adopted in the first embodiment; however, for example, a configuration in which the outer circumference of the reinforcing cord 26 is coated with the same specific LLDPE-containing resin material as that used for the tire case 17 may be adopted as well. In this case, by heating the coating resin material along with the reinforcing cord 26 at the time of winding the coated reinforcing cord on the crown portion 16 of the tire case 17, entry of air into the crown portion 16 during the embedding process can be effectively inhibited.

The tire 10 of the first embodiment is a so-called tubeless tire in which an air chamber is formed between the tire 10 and the rim 20 by fitting the bead portions 12 to the rim 20; however, the invention is not restricted to this configuration, and the tire of the invention may assume a complete tube shape.

From the production standpoint, it is easy to spirally wind the reinforcing cord 26; however, for example, a method of arranging the reinforcing cord 26 discontinuously in the width direction may also be contemplated.

Thus far, modes for carrying out the invention have been described referring to embodiments; however, these embodiments are merely examples, and the invention can be carried out with various modifications within a range that does not depart from the spirit of the invention. It is needless to say that the scope of the rights of the invention is not limited to these embodiments.

Second Embodiment

Figure 4B:
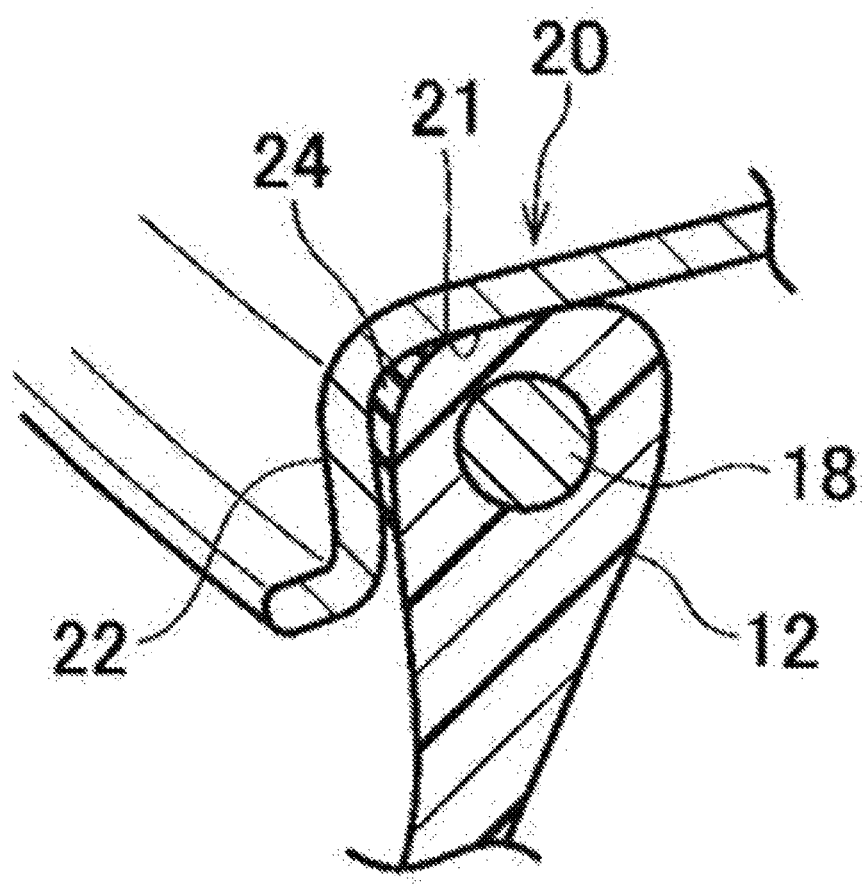
FIG. 4B is an enlarged cross-sectional view of a bead portion taken along the tire width direction, which illustrates a state where a rim is fitted to the tire according to the second embodiment.
Figure 5:
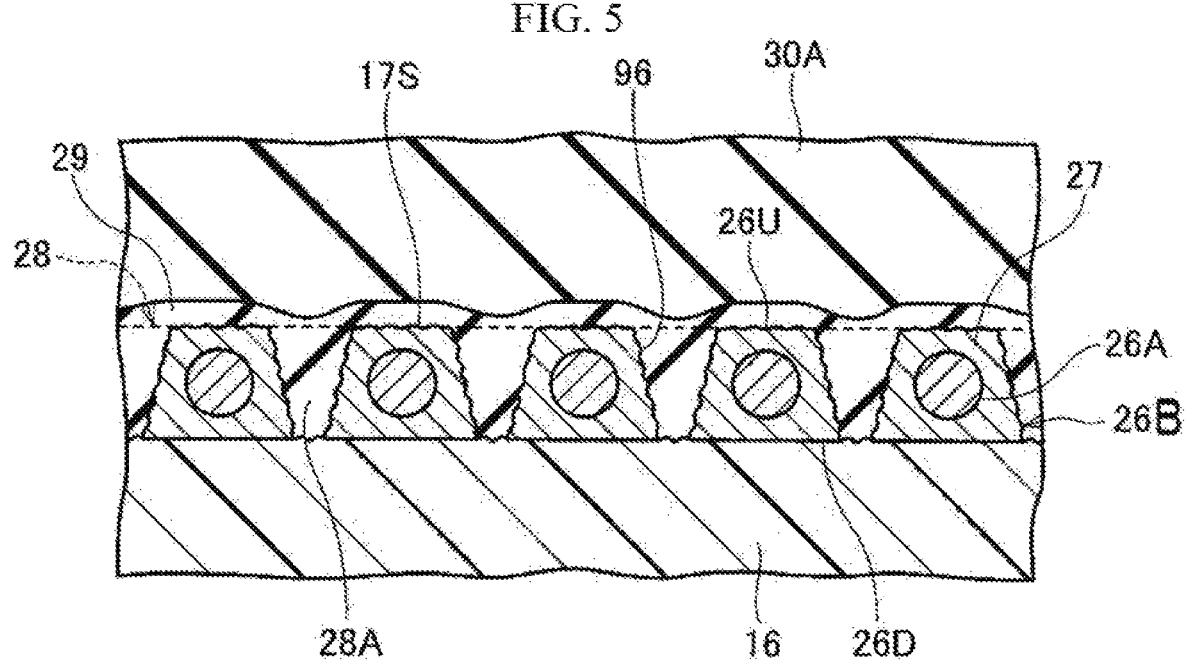
FIG. 5 is a cross-sectional view taken along the tire width direction, which illustrates the periphery of a reinforcing layer of the tire according to the second embodiment.

Next, the second embodiment of the tire of the disclosure and a method of producing the tire of this embodiment are described below referring to the drawings. Similarly to the first embodiment, the tire of this embodiment has a cross-sectional shape that is substantially the same as those of conventional ordinary rubber-made pneumatic tires. Thus, in the below-described drawings, the same reference numerals are assigned to the same constituents as those of the first embodiment. FIG. 4A is a cross-sectional view of the tire of the second embodiment taken along the tire width direction, and FIG. 4B is an enlarged cross-sectional view of a bead portion taken along the tire width direction, which illustrates a state where a rim is fitted to the tire of the second embodiment. FIG. 5 is a cross-sectional view taken along the tire width direction, which illustrates the periphery of a reinforcing layer of the tire of the second embodiment.

In the tire of the second embodiment, the tire case 17 is formed from a specific LLDPE-containing resin material as in the first embodiment.

In a tire 200 of this embodiment, as illustrated in FIGS. 4A and 5, the reinforcing cord layer 28 (indicated by a dashed line in FIG. 5) constituted by a coated cord member 26B wound in the circumferential direction is disposed on the crown portion 16. This reinforcing cord layer 28 constitutes the outer circumferential portion of the tire case 17, and reinforces the circumferential rigidity of the crown portion 16. It is noted there that the outer circumferential surface of the reinforcing cord layer 28 is included in the outer circumferential surface 17S of the tire case 17.

This coated cord member 26B is formed by coating a cord member (reinforcing cord member) 26A, which has higher rigidity than the specific LLDPE-containing resin material constituting the tire case 17, with a coating resin material 27 that is different from the specific LLDPE-containing resin material constituting the tire case 17. The coated cord member 26B and the crown portion 16 are bonded (e.g., welded or adhered with an adhesive) in those parts where they are in contact with each other.

The elastic modulus of the coating resin material 27 is preferably set to be within a range of from 0.1 times to 10 times of the elastic modulus of the specific LLDPE-containing resin material constituting the tire case 17. When the elastic modulus of the coating resin material 27 is 10 times or less of that of the specific LLDPE-containing resin material constituting the tire case 17, the crown portion is not excessively hard, so that the tire can be easily fitted to a rim. Meanwhile, when the elastic modulus of the coating resin material 27 is 0.1 times or greater of that of the specific LLDPE-containing resin material constituting the tire case 17, the resin constituting the reinforcing cord layer 28 is not excessively soft, so that excellent belt in-plane shear rigidity is attained and the cornering performance is improved. In this embodiment, the same material as the specific LLDPE-containing resin material is used as the coating resin material 27.

As illustrated in FIG. 5, the coated cord member 26B has a substantially trapezoidal cross-sectional shape. In the followings, the upper surface (the surface on the tire radial-direction outer side) and the lower surface (the surface on the tire radial-direction inner side) of the coated cord member 26B are indicated by symbols 26U and 26D, respectively. Although the coated cord member 26B is configured to have a substantially trapezoidal cross-sectional shape in this embodiment, the invention is not restricted to this configuration, and the coated cord member 26B may take any shape as long as it is not a shape in which the width of the cross-section increases from the side of the lower surface 26D (the tire radial-direction inner side) toward the side of the upper surface 26U (the tire radial-direction outer side).

As illustrated in FIG. 5, since the coated cord member 26B is arranged at intervals in the circumferential direction, gaps 28A are formed between adjacent coated cord members 26B. Accordingly, the outer circumferential surface of the reinforcing cord layer 28 has irregularities, and the outer circumferential surface 17S of the tire case 17 whose outer circumferential portion is constituted by this reinforcing cord layer 28 also has irregularities.

On the outer circumferential surface 17S (including irregularities) of the tire case 17, fine roughened irregularities are uniformly formed, and a cushion rubber 29 is bonded thereon via a bonding agent. The rubber portion of this cushion rubber 29 on the radial-direction inner side flows into the roughened irregularities.

Further, on the cushion rubber 29 (on the outer circumferential surface of the cushion rubber 29), the tread 30 composed of a material (e.g., a rubber) having superior wear resistance than the specific LLDPE-containing resin material constituting the tire case 17 is bonded.

The rubber used for the tread 30 (tread rubber 30A) is preferably a rubber of the same kind as the rubber used for conventional rubber-made pneumatic tires. Alternatively, in place of the tread 30, a tread formed from other kind of resin that has superior wear resistance than the specific LLDPE-containing resin material constituting the tire case 17 may be used as well. On the surface of the tread 30 that comes into contact with the road surface, a tread pattern (not illustrated) constituted by plural grooves is formed in the same manner as in conventional rubber-made pneumatic tires.

Next, a method of producing the tire of this embodiment is described.

(Tire Frame Forming Step)

First, in the same manner as in the first embodiment, the tire case half sections 17A are formed and then heated and pressurized using a joining mold, whereby the tire case 17 is formed.

(Reinforcing Cord Member Winding Step)

The tire production apparatus of this embodiment is the same as the one used in the first embodiment, and the cord feeding apparatus 56 of the first embodiment illustrated in FIG. 3, in which the coated cord member 26B that is obtained by coating the cord member 26A with the coating resin material 27 (the specific LLDPE-containing resin material in this embodiment) and has a substantially trapezoidal cross-sectional shape is wound on the reel 58, is employed.

First, the temperature of the heater 70 is increased, and the ambient air heated by the heater 70 is sent to the heating box 74 by an air flow generated by rotation of the fan 72. Then, the coated cord member 26B drawn from the reel 58 is transferred into the heating box 74 whose inner space has been heated with hot air, whereby the coated cord member 26B is heated (for example, the temperature of the outer circumferential surface of the coated cord member 26B is increased to a temperature of not lower than the melting point of the coating resin material 27). Here, the heating of the coated cord member 26B brings the coating resin material 27 into a molten or softened state.

The coated cord member 26B passes through the discharge outlet 76 and is then spirally wound with a constant tension on the outer circumferential surface of the crown portion 16 of the tire case 17 rotating in the direction toward the front side of the drawing. In this process, the lower surface 26D of the coated cord member 26B comes into contact with the outer circumferential surface of the crown portion 16. The melted or softened coating resin material 27 of the contact portion spreads over the outer circumferential surface of the crown portion 16, whereby the coated cord member 26B is welded to the outer circumferential surface of the crown portion 16. Consequently, the bonding strength between the crown portion 16 and the coated cord member 26B is improved.

(Roughening Treatment Step)

Subsequently, using a blasting apparatus not illustrated in the drawings, a blasting abrasive is ejected at a high speed toward the outer circumferential surface 17S of the tire case 17 while the tire case 17 is rotated. The ejected blasting abrasive collides with the outer circumferential surface 17S to form fine roughened irregularities 96, which have an arithmetic average roughness (Ra) of not less than 0.05 mm, on the outer circumferential surface 17S.

By the formation of the fine roughened irregularities 96 on the outer circumferential surface 17S of the tire case 17 in this manner, the outer circumferential surface 17S is hydrophilized, so that the wettability with the below-described bonding agent is improved.

(Layering Step)

Next, a bonding agent is applied onto the thus roughened outer circumferential surface 17S of the tire case 17.

The bonding agent is not particularly restricted and may be, for example, a triazine thiol-based adhesive, a chlorinated rubber-based adhesive, a phenolic resin adhesive, an isocyanate-based adhesive, a halogenated rubber-based adhesive, or a rubber-based adhesive. The bonding agent is preferably one which reacts at a temperature at which the cushion rubber 29 can be vulcanized (90° C. to 140° C.).

Then, the cushion rubber 29 in an unvulcanized state is wound for one lap on the outer circumferential surface 17S to which the bonding agent has been applied and, for example, a bonding agent such as a rubber cement composition is further applied onto the cushion rubber 29, after which the tread rubber 30A in a vulcanized or semi-vulcanized state is wound thereon for one lap, whereby a green tire case is obtained.

(Vulcanization Step)

Next, the thus obtained green tire case is vulcanized in a vulcanization can, a mold, or the like. In the process, the unvulcanized cushion rubber 29 flows into the roughened irregularities 96, which have been formed on the outer circumferential surface 17S of the tire case 17 by the roughening treatment. Once the vulcanization is completed, an anchoring effect is exerted by the cushion rubber 29 that has flowed into the roughened irregularities 96, and the bonding strength between the tire case 17 and the cushion rubber 29 is thereby improved. That is, the bonding strength between the tire case 17 and the tread 30 is improved by means of the cushion rubber 29.

Thereafter, the sealing layer 24, which is composed of a soft material that is softer than the specific LLDPE-containing resin material, is bonded to each bead portion 12 of the tire case 17 using an adhesive or the like, whereby the tire 200 is completed.

(Effects)

In the tire 200 of this embodiment, since the tire case 17 is formed from the specific LLDPE-containing resin material, excellent durability and creep characteristics are attained. In addition, since the specific LLDPE-containing resin material itself is lightweight and the tire 200 has a simpler structure than conventional rubber-made tires, the tire 200 is light in weight. Therefore, the tire 200 of this embodiment is highly durable, and an automobile or the like wearing the tire 200 has an improved fuel efficiency. Moreover, the specific LLDPE-containing resin material constituting the tire case 17 is extremely adhesive to the specific LLDPE-containing resin material used for the coated cord member 26B.

By constituting the reinforcing cord layer 28 with incorporation of the coated cord member 26B in this manner, the difference in hardness between the tire case 17 and the reinforcing cord layer 28 can be reduced as compared to a case where the reinforcing cord member 26A is simply fixed with the cushion rubber 29, and the specific LLDPE-containing resin material exhibits excellent adhesion with both the cord member 26A and the specific LLDPE-containing resin material constituting the tire case 17. The coated cord member 26B can thus be tightly adhered to and fixed with the tire case 17. Consequently, the above-described entry of air can be effectively inhibited, and the movement of the reinforcing cord member during running can be effectively suppressed.

When the reinforcing cord member 26A is a steel cord, the tire 200 is advantageous in terms of recycling property since, at the time of tire disposal, the cord member 26A can be easily separated and recovered from the coated cord member 26B by heating. In addition, since the specific LLDPE-containing resin material has a lower loss coefficient (tan δ) than vulcanized rubbers, the rolling performance of the tire can be improved by incorporating a large amount of the specific LLDPE-containing resin material into the reinforcing cord layer 28. The specific LLDPE-containing resin material is also more advantageous than vulcanized rubbers in that the resin material has higher in-plane shear rigidity and provides superior steering stability and wear resistance during tire running.

In the method of producing the tire of this embodiment, since the outer circumferential surface 17S of the tire case 17 is subjected to the roughening treatment in the process of integrating the tire case 17 with the cushion rubber 29 and the tread rubber 30A, the bondability (adhesiveness) is improved by an anchoring effect. Further, since the specific LLDPE-containing resin material constituting the tire case 17 is dug up due to the collision of the blasting abrasive, the wettability with the bonding agent is improved. Consequently, the bonding agent is retained in a uniformly coated state on the outer circumferential surface 17S of the tire case 17, so that the bonding strength between the tire case 17 and the cushion rubber 29 can be ensured.

Particularly, even when irregularities are formed on the outer circumferential surface 17S of the tire case 17, the vicinities of recesses (recess walls and recess bottoms) are roughened by allowing the blasting abrasive to collide with the recesses (gaps 28A), and the bonding strength between the tire case 17 and the cushion rubber 29 can thereby be ensured.

Meanwhile, since the cushion rubber 29 is disposed on the roughened region of the outer circumferential surface 17S of the tire case 17, the bonding strength between the tire case 17 and the cushion rubber can be effectively ensured.

When the cushion rubber 29 is vulcanized in the vulcanization step, the cushion rubber 29 flows into the roughened irregularities formed on the outer circumferential surface 17S of the tire case 17 by the roughening treatment. Then, once the vulcanization is completed, an anchoring effect is exerted by the cushion rubber 29 that has flowed into the roughened irregularities, and the bonding strength between the tire case 17 and the cushion rubber 29 is thereby improved.

In the tire 200 produced by such a tire production method, the bonding strength between the tire case 17 and the cushion rubber 29 is ensured, that is, the bonding strength between the tire case 17 and the tread 30 is ensured by means of the cushion rubber 29. Consequently, delamination between the outer circumferential surface 17S of the tire case 17 and the cushion rubber 29 in the tire 200 is suppressed during running and the like.

Further, since the outer circumferential portion of the tire case 17 is constituted by the reinforcing cord layer 28, the puncture resistance and the cut resistance are improved as compared to a case where the outer circumferential portion is constituted by a member other than the reinforcing cord layer 28.

Moreover, since the reinforcing cord layer 28 is formed by winding the coated cord member 26B, the circumferential rigidity of the tire 200 is improved. The improvement in the circumferential rigidity leads to suppression of creeping of the tire case 17 (a phenomenon that plastic deformation of the tire case 17 increases with time under constant stress), as well as improvement in the pressure resistance against air pressure applied from the tire radial-direction inner side.

In this embodiment, irregularities are formed on the outer circumferential surface 17S of the tire case 17; however, the invention is not restricted to this configuration, and a configuration in which the outer circumferential surface 17S formed flat may be adopted as well.

Further, in the tire case 17, a reinforcing cord layer may be formed in such a manner that the coated cord member wound and bonded on the crown portion of the tire case is covered with a coating thermoplastic material. In this case, a coating layer can be formed by discharging the coating thermoplastic material in a molten or softened state onto the reinforcing cord layer 28. Alternatively, a coating layer may be formed by heating a welding sheet into a molten or softened state and subsequently pasting the welding sheet to the surface (outer circumferential surface) of the reinforcing cord layer 28, without using an extruder.

In the second embodiment, case segments (tire case half sections 17A) are joined to form the tire case 17; however, the invention is not restricted to this configuration, and the tire case 17 may be integrally formed using a mold or the like.

The tire 200 of the second embodiment is a so-called tubeless tire in which an air chamber is formed between the tire 200 and the rim 20 by fitting the bead portions 12 to the rim 20; however, the invention is not restricted to this configuration, and the tire 200 may assume, for example, a complete tube shape.

In the second embodiment, the cushion rubber 29 is arranged between the tire case 17 and the tread 30; however, the invention is not restricted to this configuration, and a configuration in which the cushion rubber 29 is not arranged may be adopted as well.

In the second embodiment, a configuration in which the coated cord member 26B is spirally wound on the crown portion 16 is adopted; however, the invention is not restricted to this configuration, and a configuration in which the coated cord member 26B is wound to be discontinuous in the width direction may be adopted as well.

In the second embodiment, the specific LLDPE-containing resin material is used as the coating resin material 27 constituting the coated cord member 26B, and this coating resin material 27 is heated into a molten or softened state and used for welding the coated cord member 26B to the outer circumferential surface of the crown portion 16; however, the invention is not restricted to this configuration, and a configuration in which the coated cord member 26B is adhered to the outer circumferential surface of the crown portion 16 using an adhesive or the like, without heating the coating resin material 27, may be adopted as well.

Alternatively, a configuration in which the specific LLDPE-containing resin material is used as the coating resin material 27 constituting the coated cord member 26B and the coated cord member 26B is adhered to the outer circumferential surface of the crown portion 16 using an adhesive or the like, without heating the coated cord member 26B, may be adopted.

Moreover, a configuration in which a thermosetting resin is used as the coating resin material 27 constituting the coated cord member 26B and the tire case 17 is formed from the specific LLDPE-containing resin material may be adopted. In this case, the coated cord member 26B may be adhered to the outer circumferential surface of the crown portion 16 using an adhesive or the like, or the coated cord member 26B may be welded to the outer circumferential surface of the crown portion 16 by heating, into a molten or softened state, the part of the tire case 17 where the coated cord member 26B is to be arranged.

Furthermore, a configuration in which the specific LLDPE-containing resin material is used as the coating resin material 27 constituting the coated cord member 26B and the tire case 17 is also formed from the specific LLDPE-containing resin material may be adopted. In this case, the coated cord member 26B may be adhered to the outer circumferential surface of the crown portion 16 using an adhesive or the like, or the coated cord member 26B may be welded to the outer circumferential surface of the crown portion 16 by heating the coating resin material 27 into a molten or softened state while heating, into a molten or softened state, the part of the tire case 17 where the coated cord member 26B is to be arranged. When the tire case 17 and the coated cord member 26B are both heated into a molten or softened state, since these members are mixed with each other well, the bonding strength is improved. Further, in cases where a resin material containing the specific LLDPE is used as both the specific LLDPE-containing resin material constituting the tire case 17 and the coating resin material 27 constituting the coated cord member 26B, for example, the resin materials are preferably of the same kind, particularly preferably the same material.

The roughened outer circumferential surface 17S of the tire case 17 may be activated by further performing thereon a corona treatment, a plasma treatment or the like and, after the hydrophilicity is thereby improved, an adhesive may be applied thereto.

The sequence for the production of the tire 200 is not restricted to the one adopted in the second embodiment and may be modified as appropriate.

Thus far, modes for carrying out the invention have been described referring to embodiments; however, these embodiments are merely examples, and the invention can be carried out with various modifications within a range that does not depart from the spirit of the invention. It is needless to say that the scope of the rights of the invention is not limited to these embodiments.

Furthermore, concrete modes of the invention have been described by way of the first and the second embodiments; however, the invention is not restricted to the above-described modes.

The tire of the disclosure may be configured in the following manner as described in the first embodiment.

(1-1) The tire of the disclosure may be configured such that, in a cross-sectional view taken along the axial direction of the tire frame, at least a part of the reinforcing cord member is embedded in the outer circumferential portion of the tire frame formed from the specific LLDPE-containing resin material.

With a part of the reinforcing cord member being embedded in the outer circumferential portion of the tire frame in this manner, a phenomenon that air remains in the periphery of the cord at the time of winding the reinforcing cord member (entry of air) can be further inhibited. The inhibition of the entry of air to the periphery of the reinforcing cord member leads to suppression of the movement of the reinforcing cord member caused by an input or the like during running. As a result, for example, when a tire-constituting member is arranged on the outer circumferential portion of the tire frame in such a manner to cover the entirety of the reinforcing cord member, since the movement of the reinforcing cord member is suppressed, delamination and the like between these members (including the tire frame) are inhibited, so that the durability is improved.

(1-2) In the tire of the disclosure, a tread formed from a material having superior wear resistance than the specific LLDPE-containing resin material may be arranged on the radial-direction outer side of the reinforcing cord layer.

By constituting the tread, which comes into contact with the road surface, with a material having superior wear resistance than the specific LLDPE-containing resin material in this manner, the wear resistance of the tire can be further improved.

(1-3) In the tire of the disclosure, the reinforcing cord member can be embedded in the outer circumferential portion of the tire frame along the circumferential direction to a depth of not less than ⅕ of the diameter of the reinforcing cord member in a cross-sectional view taken along the axial direction of the tire frame.

With not less than ⅕ of the diameter of the reinforcing cord member being embedded in the outer circumferential portion of the tire frame in a cross-sectional view taken along the axial direction of the tire frame, the entry of air to the periphery of the reinforcing cord member can be effectively inhibited, so that the movement of the reinforcing cord member caused by an input or the like during running can be further suppressed.

(1-4) The tire of the disclosure may be configured such that the tire frame includes, on the radial-direction inner side, bead portions each coming in contact with a bead sheet and rim flange of a rim, and an annular bead core composed of a metal material is embedded in each bead portion.

By, in this manner, providing the tire frame with the bead portions that serve as parts to be fitted with the rim and embedding the annular bead core composed of a metal material in each bead portion, the tire frame (i.e., tire) can be firmly retained on the rim in the same manner as in conventional rubber-made pneumatic tires.

(1-5) In the tire of the disclosure, a sealing portion composed of a material having superior sealing performance (adhesiveness with a rim) than the specific LLDPE-containing resin material can be arranged on the part of each bead portion that comes into contact with the rim.

By, in this manner, arranging the sealing portion composed of a material having superior sealing performance than the specific LLDPE-containing resin material on the parts where the tire frame and the rim come into contact with each other, adhesion between the tire (tire frame) and the rim can be improved. Consequently, as compared to a case where only the rim and the specific LLDPE-containing resin material are used, leakage of air from the tire can be further inhibited. In addition, the rim fittability of the tire can also be improved by arranging the sealing portion.

(1-6) The tire of the disclosure can be produced by a production method which includes: the tire frame piece forming step of forming tire frame pieces that constitute a part of a circular tire frame using a thermoplastic resin material containing at least a polyolefin-based thermoplastic elastomer; the tire frame piece bonding step of forming a tire frame by fusing two or more tire frame pieces, which make a pair, with application of heat to the bonding surfaces of the tire frame pieces; and the reinforcing cord member winding step of winding a reinforcing cord member on the outer circumferential portion of the tire frame in the circumferential direction to form a reinforcing cord layer.

In this production method, the tire frame pieces of the circular tire frame may be formed from the specific LLDPE-containing resin material. The melting point of the specific LLDPE-containing resin material can be set to be from 80° C. to 200° C. or so; therefore, for example, it is not necessary to perform the step of fusing the tire frame pieces at 250° C. or higher, so that the fusing step can be performed at a relatively low temperature. Since the fusing step can be performed at a relatively low temperature in this manner, the productivity of the tire can be improved in terms of energy utilization rate and the like. In addition, when the tire frame is formed by fusing the tire frame pieces formed from the specific LLDPE-containing resin material, a sufficient bonding strength is attained between the tire frame pieces, and the performance of the frame itself is not deteriorated by the temperature of the fusing process; therefore, the durability during running (e.g., puncture resistance and wear resistance) can be improved in the thus produced tire.

(1-7) The production method of the tire may be configured such that, in the tire frame piece bonding step, the bonding surfaces of the tire frame pieces are heated to a temperature of not lower than the melting point (e.g., a temperature of from the melting point+10° C. to the melting point+150° C.) of the specific LLDPE-containing resin material constituting the tire frame pieces.

By, in this manner, heating the bonding surfaces of the segments to a temperature of not lower than the melting point of the specific LLDPE-containing resin material constituting the tire frame pieces, the tire frame pieces can be sufficiently fused with other; therefore, the productivity of the tire can be improved while enhancing the durability of the tire.

(1-8) The production method of the tire may be configured such that, in the reinforcing cord member winding step, the reinforcing cord member is wound on the outer circumferential portion of the tire frame in such a manner that at least a part of the reinforcing cord member is embedded while melting or softening the outer circumferential portion of the tire frame formed in the tire frame piece bonding step.

By, in this manner, winding the reinforcing cord member on the outer circumferential portion of the tire frame in such a manner that at least a part of the reinforcing cord member is embedded while melting or softening the outer circumferential portion of the tire frame, the at least a part of the reinforcing cord member which is thus embedded and the thus melted or softened specific LLDPE-containing resin material can be welded together. Consequently, the entry of air between the outer circumferential portion of the tire frame and the reinforcing cord member in a cross-sectional view taken along the axial direction of the tire frame can be further inhibited. In addition, when the part where the reinforcing cord member is embedded is cooled and solidified, the fixed state of the reinforcing cord member embedded in the tire frame is improved.

(1-9) The production method of the tire may be configured such that, in the reinforcing cord member winding step, not less than 1/5 of the diameter of the reinforcing cord is embedded in the outer circumferential portion of the tire frame in a cross-sectional view taken along the axial direction of the tire frame.

By, in this manner, embedding not less than 1/5 of the diameter of the reinforcing cord member in the outer circumferential portion of the tire frame in a cross-sectional view taken along the axial direction of the tire frame, the entry of air to the periphery of the reinforcing cord during the production can be effectively inhibited, and the embedded reinforcing cord member can be made less likely to come out of the tire frame.

(1-10) The production method of the tire may be configured such that, in the reinforcing cord member winding step, the heated reinforcing cord member is embedded in the tire frame.

By, in this manner, embedding the reinforcing cord member in the tire frame with heating in the reinforcing cord member winding step, when the heated reinforcing cord member comes into contact with the outer circumferential portion of the tire frame, the part in contact is melted or softened; therefore, the reinforcing cord member can be easily embedded in the outer circumferential portion of the tire frame.

(1-11) The production method of the tire may be configured such that, in the cord member winding step, the part of the outer circumferential portion of the tire frame where the reinforcing cord member is to be embedded is heated.

By, in this manner, heating the part of the outer circumferential portion of the tire frame where the reinforcing cord member is to be embedded, since the heated part of the tire frame is melted or softened, the reinforcing cord member can be easily embedded therein.

(1-12) The production method of the tire may be configured such that, in the cord member winding step, the reinforcing cord member is spirally wound in the circumferential direction of the outer circumferential portion of the tire frame while pressing the reinforcing cord member against the outer circumferential portion of the tire frame.

By, in this manner, spirally winding the reinforcing cord member while pressing the reinforcing cord member against the outer circumferential portion of the tire frame, the amount of the reinforcing cord member embedded in the outer circumferential portion of the tire frame can be adjusted.

(1-13) The production method may be configured such that, in the cord member winding step, after winding the reinforcing cord member on the tire frame, the melted or softened part of the outer circumferential portion of the tire frame is cooled.

By, in this manner, forcibly cooling the melted or softened part of the outer circumferential portion of the tire frame after embedding the reinforcing cord member, the melted or softened part of the outer circumferential portion of the tire frame can be cooled and solidified more quickly and rapidly than natural cooling. By cooling the outer circumferential portion of the tire more quickly than natural cooling, not only deformation of the outer circumferential portion of the tire frame can be inhibited but also the movement of the reinforcing cord member can be suppressed.

Further, the tire of the disclosure may be configured in the following manner as described in the second embodiment.

(2-1) The tire of the disclosure may be configured by the above-described production method which further includes: the roughening treatment step of roughening the outer circumferential surface of the tire frame by allowing a particle-form blasting abrasive to collide with the outer circumferential surface of the tire frame; and the layering step of layering a tire-constituting rubber member on the thus roughened outer circumferential surface via a bonding agent.

By incorporating the roughening treatment step in this manner, the particle-form blasting abrasive is made to collide with the outer circumferential surface of the circular tire frame formed from the specific LLDPE-containing resin material, and fine roughened irregularities are thereby formed on the outer circumferential surface. Such a treatment of forming fine roughened irregularities by allowing the blasting abrasive to collide with the outer circumferential surface of the tire frame is referred to as "roughening treatment". Thereafter, on the outer circumferential surface which has been subjected to the roughening treatment, the tire-constituting rubber member is layered via the bonding agent. Here, since the outer circumferential surface of the tire frame is subjected to the roughening treatment in the process of integrating the tire frame with the tire-constituting rubber member, the bondability (adhesiveness) is improved by an anchoring effect. In addition, since the specific LLDPE-containing resin material constituting the tire frame is dug up due to the collision of the blasting abrasive, the wettability of the outer circumferential surface is improved. Consequently, the bonding agent is retained in a uniformly coated state on the outer circumferential surface of the tire frame, so that the bonding strength between the tire frame and the tire-constituting rubber member can be ensured.

(2-2) In the tire of the disclosure, at least a part of the outer circumferential surface of the tire frame has irregularities, and the irregularities can be produced by performing a roughening treatment in the roughening treatment step.

Even when at least a part of the outer circumferential surface of the tire frame has irregularities, the vicinities of recesses (recess walls and recess bottoms) are roughened by allowing the blasting abrasive to collide with the irregularities, and the bonding strength between the tire frame and the tire-constituting rubber member can thereby be ensured.

(2-3) In the tire of the disclosure, the outer circumferential portion of the tire frame is constituted by a reinforcing layer that constitutes the irregularities on the outer circumferential surface, and the reinforcing layer can be formed by winding a coated cord member, which is formed by coating a reinforcing cord with a resin material of the same kind as or a different kind from the specific LLDPE-containing resin material constituting the tire frame, in the circumferential direction of the tire frame.

By, in this manner, constituting the outer circumferential portion of the tire frame with a reinforcing layer formed by winding a coated cord member in the circumferential direction of the tire frame, the circumferential rigidity of the tire frame can be improved.

(2-4) In the tire of the disclosure, a thermoplastic resin material may be used as the resin material constituting the coated cord member.

By using a thermoplastic material having thermoplasticity as the resin material constituting the coated cord member in this manner, the tire can be produced and recycled more easily as compared to a case where a thermosetting material is used as the resin material.

(2-5) The tire of the disclosure may be configured such that, in the roughening treatment step, a roughening treatment is performed on a region that is larger than the region where the tire-constituting rubber member is layered.

By, in this manner, performing a roughening treatment in the roughening treatment step on a region that is larger than the region where the tire-constituting rubber member is layered, the bonding strength between the tire frame and the tire-constituting rubber member can be certainly ensured.

(2-6) The tire of the disclosure may be configured such that, in the roughening treatment step, a roughening treatment is performed on the outer circumferential surface in such a manner to attain an arithmetic average roughness (Ra) of not less than 0.05 mm.

By, in this manner, performing a roughening treatment in the roughening treatment step on the outer circumferential surface of the tire frame in such a manner to attain an arithmetic average roughness (Ra) of not less than 0.05 mm, when, for example, a tire-constituting rubber member in an unvulcanized or semi-vulcanized state is layered on the thus roughened outer circumferential surface via a bonding agent and subsequently vulcanized, the rubber of the tire-constituting rubber member is allowed to flow into the bottom of the roughened irregularities formed by the roughening treatment. With the rubber of the tire-constituting rubber member being allowed to flow into the bottom of the roughened irregularities, a sufficient anchoring effect is exerted between the outer circumferential surface and the tire-constituting rubber member, and the bonding strength between the tire frame and the tire-constituting rubber member can thereby be improved.

(2-7) In the tire of the disclosure, a rubber in an unvulcanized or semi-vulcanized state can be used as the tire-constituting rubber member.

By using a rubber in an unvulcanized or semi-vulcanized state as the tire-constituting rubber member in this manner, when the tire-constituting rubber member is vulcanized, the rubber flows into the roughened irregularities formed on the outer circumferential surface of the tire frame by the roughening treatment. Once the vulcanization is completed, an anchoring effect is exerted by the rubber (vulcanized) that has flowed into the roughened irregularities, and the bonding strength between the tire frame and the tire-constituting rubber member can thereby be improved.

The term "vulcanized (state)" refers to a state where the vulcanization degree has reached the level required for a final product, and the term "semi-vulcanized state" refers to a state where the vulcanization degree is higher than that of an unvulcanized state but has not yet reached to the level required for a final product.

(2-8) The tire of the disclosure may be configured to include: a circular tire frame, which is formed from the specific LLDPE-containing resin material and whose outer circumferential surface has been subjected to a roughening treatment by allowing a particle-form blasting abrasive to collide therewith; and a tire-constituting rubber member, which is layered on the thus roughened outer circumferential surface via a bonding agent.

By using a circular tire frame subjected to a roughening treatment in this manner, the bonding strength between the tire frame and the tire-constituting rubber member can be improved by an anchor effect. Further, since the outer circumferential surface has been subjected to the roughening treatment, favorable wettability with the bonding agent is attained. Consequently, the bonding agent is retained in a uniformly coated state on the outer circumferential surface of the tire frame, and the bonding strength between the tire frame and the tire-constituting rubber member is thereby ensured, so that delamination between the tire frame and the tire-constituting rubber member can be inhibited.

EXAMPLES

The invention is described below more concretely by way of examples thereof. However, the invention is not restricted thereto.

Comparative Examples 2, 3, 6, and 8

Sample pieces were obtained by injection molding, at a temperature of from 180° C. to 230° C., each of the resin materials for producing the respective tire frames of Comparative Examples 2, 3, 6, and 8 that are shown in Table 1. Various measurements were performed using samples prepared by punching out test pieces from the thus obtained sample pieces.

Examples 7 to 9 and 12

The resin materials for producing the respective tire frames of Examples 7 to 9 and 12 that are shown in Table 2 were mixed at a temperature of from 180° C. to 230° C. using a biaxial extruder in accordance with the respective formulations shown in Table 2, whereby resin materials were obtained. The thus obtained resin materials were each made into a pellet, and sample pieces were each obtained by injection-molded the pellet at a temperature of from 180° C. to 230° C. Various measurements were performed using samples prepared by punching out test pieces from the thus obtained sample pieces.

<Crystallization Degree>

Using a differential scanning calorimeter (DSC; Q2000, manufactured by TA Instruments Inc.), the resin materials (LLDPEs) of Examples 7 to 9 and 12 and Comparative Examples 2 and 3 were each heated from −60° C. to 220° C. at a rate of 10° C./min, and the fusion heat amount was measured. The crystallization degree (melting energy, unit=J/g) was determined from the endothermic peak area.

<Tensile Elastic Modulus>

Each sample was punched out to prepare a dumbbell-shaped test piece (No. 3 test piece) defined in JIS K6251: 1993.

Then, using SHIMADZU AUTOGRAPH AGS-J (5 kN) manufactured by Shimadzu Corporation, the tensile elastic modulus of each test piece was measured at a chuck distance of 50 mm and a tensile rate of 100 mm/min.

The results thereof are shown in Tables 1 and 2 below.

<Creeping>

Each sample was punched out to prepare a dumbbell-shaped test piece (No. 3 test piece) defined in JIS K6251: 1993.

For each of the thus obtained JIS No. 3 dumbbell-shaped test pieces, the amount of creeping after 6 hours was measured in accordance with JIS K7115:1999 at a chuck distance of 65 mm under the conditions of 4 MPa and 90° C.

The results thereof are shown in Tables 1 and 2 below. A lower creeping value means a more favorable result, and a creeping value of 30 mm or less is the acceptable range.

<Evaluation of Durability>

—High-Speed Performance Test—

In accordance with the above-described first embodiment, tires of Examples and Comparative Examples were molded. In this process, as the resin materials constituting the respective tire cases, the materials shown in Tables 1 and 2 below were used in accordance with the respective formulations shown in these tables.

For each of the thus obtained tires (size: 245/35 R20) of Examples and Comparative Examples, a high-speed performance test was conducted based on the High Speed Performance Test B prescribed in JIS D4230:1998, and the tire durability was evaluated. The results thereof are shown in Tables 1 and 2.

In the high-speed performance test, after preliminary running, a 20-minute running test was performed at a prescribed speed, and this running test was repeated by gradually increasing the speed. The high-speed performance test was terminated at the completion of a running test at a speed of 260 km/h.

A tire which maintained its functions even after the completion of the running test at a speed of 260 km/h was evaluated as "complete", while a tire which could no longer run prior to the completion of the running test at a speed of 260 km/h due to detachment of a member, leakage of air, tire swelling or the like was evaluated as "incomplete". A tire which received an evaluation result of "complete" is regarded as a tire having excellent durability.

The abbreviations used in Table 1 mean as follows.

LDPE: UBE POLYETHYLENE J-2516, manufactured by Ube-Maruzen Polyethylene Co., Ltd.

LLDPE1: UMERIT 0540F, manufactured by Ube-Maruzen Polyethylene Co., Ltd., crystallization degree=78.5 J/g, weight-average molecular weight=160,700, MFR=4.0 g/10 min LLDPE2: UMERIT 1540F, manufactured by Ube-Maruzen Polyethylene Co., Ltd., crystallization degree=110.5 J/g, weight-average molecular weight=159,223, MFR=4.9 g/10 min LLDPE3: UMERIT 2525F, manufactured by Ube-Maruzen Polyethylene Co., Ltd., crystallization degree=122.3 J/g, weight-average molecular weight=184,912, MFR=7.9 g/10 min LLDPE4: UMERIT 3540F, manufactured by Ube-Maruzen Polyethylene Co., Ltd., crystallization degree=138.3 J/g, weight-average molecular weight=164,249, MFR=26.0 g/10 min LLDPE5: UMERIT 4040F, manufactured by Ube-Maruzen Polyethylene Co., Ltd., crystallization degree=150.1 J/g, weight-average molecular weight=163,711, MFR=5.0 g/10 min HDPE: NIPOLON HARD 2300, manufactured by Tosoh Corporation R-PP1: PRIME TPO J5710, manufactured by Prime Polymer Co., Ltd.

R-PP2: PP J721GR, manufactured by Prime Polymer Co., Ltd.

TPV: MILASTOMER M4800NS, manufactured by Mitsui Chemicals, Inc.

The weight-average molecular weight is a value measured by gel permeation chromatography (GPC), and the MFR is a value measured in accordance with the method prescribed in JIS K7210:2014 at a temperature of 230° C. under a load of 2.16 kg.

TABLE 1

| | | Comparative Example 2 | Comparative Example 3 | Comparative Example 6 | Comparative Example 8 |
|---|---|---|---|---|---|
| Resin material of tire frame | LDPE | | | | |
| | LLDPE1 | | | | |
| | LLDPE2 | | | | |
| | LLDPE3 | | | | |
| | LLDPE4 | 100 | | | |
| | LLDPE5 | | 100 | | |
| | HDPE | | | | |
| | R-PP1 | | | 100 | |
| | R-PP2 | | | | |
| | TPV | | | | 100 |
| Physical properties | Crystallization degree of LLDPE (J/g) | 138.3 | 150.1 | — | — |
| | Tensile elastic modulus (MPa) | 496 | 686 | 321 | 365 |
| | Creeping (mm) | 6 | 5 | broken | 186 |
| | High-speed performance test | incomplete | incomplete | incomplete | incomplete |

TABLE 2

| | | Example 7 | Example 8 | Example 9 | Example 12 |
|---|---|---|---|---|---|
| Resin material of tire frame | LLDPE2 | 76.2 | 80 | 80 | 66.7 |
| | PA1 | | | 10 | 19.0 |
| | PA2 | | | | |
| | PA-modified PE | 19.0 | 20 | 10 | 9.5 |
| | Acid-modified PE | 4.8 | | | 4.8 |
| Physical properties | Crystallization degree of LLDPE (J/g) | 110.5 | 110.5 | 110.5 | 110.5 |
| | Tensile elastic modulus (MPa) | 162 | 147 | 231 | 303 |
| | Creeping (mm) | 26 | 22 | 30 | 20 |
| | High-speed performance test | complete | complete | complete | complete |

The abbreviations used in Table 2 mean as follows.

PA1: UBE NYLON 1022B, manufactured by Ube Industries, Ltd.

PA2: UBESTA 3024U, manufactured by Ube Industries, Ltd.

PA-modified PE: APOLHYA LP91, manufactured by Arkema K.K.

Acid-modified PE: ADMER NE065, manufactured by Mitsui Chemicals, Inc.

<Bending Fatigue Resistance>

For Examples 1, 3 and 5, the bending fatigue resistance was evaluated in accordance with JIS K6260:2010. Specifically, a sample piece of 25 mm in width, 6.3 mm in thickness and 140 mm to 155 mm in length, which had a groove having a radius of curvature of 2.38 mm in the center, was prepared and, for this sample piece, the De Mattia bending fatigue test was performed at a distortion of 10 mm using a bending fatigue tester FT24-6400 manufactured by A&D Co., Ltd. to measure the number of bending operations required for breaking the sample piece. The results thereof are shown in Table 3 below. It is noted here that a higher bending fatigue resistance value indicates a more favorable result, and the tire has no problem in practical use as long as the number of bending operations required for breaking the sample piece is 90,000 or greater. The abbreviations used in Table 3 have the same meanings as those used in Tables 1 and 2.

TABLE 3

|  |  | Example 1 | Example 3 | Example 5 |
|---|---|---|---|---|
| Resin material of tire frame | LLDPE2 | 100 | 80 | 76.2 |
|  | LLDPE4 |  |  |  |
|  | LLDPE5 |  |  |  |
|  | PA1 |  | 20 | 19.0 |
|  | PA2 |  |  |  |
|  | PA-modified PE |  |  |  |
|  | Acid-modified PE |  |  | 4.8 |
|  | R-PP1 |  |  |  |
|  | TPV |  |  |  |
| Evaluation | Bending fatigue resistance (×10,000) | >600 | 9 | 356 |

From the comparison of the results shown in Table 3 between Example 1 and Example 3, it is seen that the resin material containing a combination of an LLDPE and a polyamide (PA) had a tendency of causing a reduction in bending fatigue resistance as compared to the resin material containing only the LLDPE. Since the bending fatigue resistance value of Example 3 was 90,000, the tire has no problem in practical use.

Further, from the comparison between Example 3 and Example 5, it is seen that the resin material containing an LLDPE, a polyamide and an acid-modified PE resulted in a greater improvement in the bending fatigue resistance than the resin material containing the LLDPE and the polyamide.

<Heat Resistance>

Sample pieces having a size of 30 mm×100 mm and a thickness of 2.5 mm were prepared using the respective resin materials for producing the tire frames of Examples 7 to 9 and 12. The thus obtained sample pieces were each heated at 145° C. for 20 minutes, and deformation thereof was visually observed.

As a result, it was found that Examples 7 to 9 and 12 all sustained less deformation after the heating and thus had superior heat resistance than Example 1. Particularly, Examples 9 and 12 had excellent heat resistance.

From the above-described results, the tires of Examples 7 to 9 and 12 are believed to be also applicable to a tire production method that includes the step of performing vulcanization at a high temperature (e.g., 145° C.) and the conventional step of performing vulcanization over a long period. Accordingly, by adopting a tire of the mode described in these Examples, it is no longer necessary to employ a cold vulcanization production method, which is performed for the purpose of suppressing the effects of heat on a tire frame by separately vulcanizing a tread rubber and then adhering the tire frame formed from a resin material with the thus vulcanized tread rubber, and a vulcanization production method in which the temperature is controlled such that the resin material is not deformed; therefore, not only the production process can be simplified and the vulcanization time can be shortened, but also a further improvement in productivity is expected.

All the documents, patent applications and technical standards that are described in the present specification are hereby incorporated by reference to the same extent as if each individual document, patent application or technical standard is concretely and individually described to be incorporated by reference.

The invention claimed is:

1. A tire comprising a circular tire frame formed from a resin material that contains a linear low-density polyethylene having a crystallization degree of from 110 J/g to 138 J/g, and wherein the resin material further contains a polyamide.

2. The tire according to claim 1, wherein a content ratio of the polyamide is from 0.10 to 0.30 with respect to the linear low-density polyethylene in the resin material.

3. The tire according to claim 1, wherein the resin material further contains an acid-modified polyethylene.

4. The tire according to claim 1, wherein the resin material further contains a polyamide-modified polyethylene.

5. The tire according to claim 1, wherein a content of the linear low-density polyethylene is not less than 50% by mass with respect to a total mass of the resin material.

* * * * *